United States Patent
Richter et al.

(10) Patent No.: US 10,521,010 B2
(45) Date of Patent: Dec. 31, 2019

(54) SYSTEM AND METHOD FOR HAPTIC INTERACTION WITH VIRTUAL OBJECTS

(71) Applicant: Technische Universität Dresden, Dresden (DE)

(72) Inventors: Andreas Richter, Dresden (DE); Georgi Paschew, Dresden (DE); Uwe Marschner, Coswig (DE)

(73) Assignee: TECHNISCHE UNIVERSITAET DRESDEN, Dresden (DE)

( * ) Notice: Subject to any disclaimer, the term of this patent is extended or adjusted under 35 U.S.C. 154(b) by 0 days.

(21) Appl. No.: 15/680,210

(22) Filed: Aug. 18, 2017

(65) Prior Publication Data
US 2018/0157317 A1    Jun. 7, 2018

(30) Foreign Application Priority Data
Aug. 18, 2016   (DE) .................. 10 2016 215 481

(51) Int. Cl.
| | | |
|---|---|---|
| *G06F 3/01* | (2006.01) | |
| *G06T 19/00* | (2011.01) | |
| *G02B 27/01* | (2006.01) | |

(52) U.S. Cl.
CPC ............. *G06F 3/011* (2013.01); *G06F 3/016* (2013.01); *G06T 19/006* (2013.01); *G02B 27/01* (2013.01)

(58) Field of Classification Search
CPC ..... A61B 5/04888; A61B 5/1127; A61F 2/68; A61F 4/00; G06F 19/00
See application file for complete search history.

(56) References Cited

U.S. PATENT DOCUMENTS

| | | | | |
|---|---|---|---|---|
| 2008/0094351 | A1* | 4/2008 | Nogami ................. | G06F 3/016 345/156 |
| 2009/0254869 | A1* | 10/2009 | Ludwig .................. | G06F 3/038 715/863 |

(Continued)

FOREIGN PATENT DOCUMENTS

| | | |
|---|---|---|
| DE | 102 26 746 A1 | 12/2003 |
| EP | 2 827 224 A1 | 1/2015 |
| JP | H08257947 A | 10/1996 |

OTHER PUBLICATIONS

Kaczmarek, K.A., Electroactive adaptation on the abdomen: Preliminary results, IEEE Trans. Rehab. Eng. 8 (2000), 499-505.

(Continued)

*Primary Examiner* — Shaheda A Abdin
(74) *Attorney, Agent, or Firm* — FisherBroyles, LLP; Andrew K. Gonsalves, Esq.

(57) ABSTRACT

The invention relates to a system and a method for haptic interaction with virtual objects. The system of the invention is based on the idea that, for the haptic representation of any virtual three-dimensional object—synchronized with the visual representation—only the tangible haptic characteristics of the surface area of the object at the collision point or the area of contact are important. The haptic display system (morphling) of the invention that displays these characteristics comprises in principle three functional groups, which operate in synchronism with one another and with a visual subsystem. The individual subsystems can be operated statically or dynamically. In dynamic operation, users can change the position and/or shape, for example, of the tactile display by touching it.

With regard to the real-time representation of the three-dimensional data of the user, at least the body part that is interacting with the object, e.g. the hand, must be repre- (Continued)

sented in the visual system; the body part may also be directly visible, as with a head-up display. Ideally, all body parts of the user that lie within the user's field of view are displayed visually. With the synchronized real-time combination in the visual subsystem, users and objects that are actually spatially separated are displayed virtually in a defined spatial proximity. In this virtual representation, the user thus sees himself touching the virtual object. At the time of collision and at the collision point, however, he does not actually interact with the object represented in the visual system, but with a haptic display subsystem, the morphling, in a tactile subsystem which, in the tangible portion of the virtual object, displays the object's haptic characteristics, e.g. its surface condition and shape, synchronized in real time with the visual representation.

The interaction between the at least one body part of the visualized user and the visualized object are represented in the visual subsystem simultaneously with the interaction of the user with the tactile display system, and upon collision of the at least one part of the visualized user with the visualized object, a collision point is determined. The three-dimensional data of the object at the collision point of the at least one part of the visualized user with the visualized object are presented in the tactile subsystem, the haptic element having a surface with structuring that is designed such that the haptic element displays the three-dimensional structure of the object at the collision point based on the captured three-dimensional data of the object, at least in the area of the collision point.

22 Claims, 7 Drawing Sheets

(56) References Cited

U.S. PATENT DOCUMENTS

| | | | |
|---|---|---|---|
| 2011/0238079 A1* | 9/2011 | Hannaford | G06F 3/011 606/130 |
| 2012/0004579 A1* | 1/2012 | Luo | A61B 5/04888 600/595 |
| 2015/0316985 A1* | 11/2015 | Levesque | G06T 19/006 345/156 |
| 2015/0370317 A1* | 12/2015 | Cha | G06F 3/002 345/676 |
| 2016/0026253 A1* | 1/2016 | Bradski | G02B 27/225 345/8 |

OTHER PUBLICATIONS

Ikei et al., Texture presentation by vibratory tactile display, Proc. IEEE Virtual Reality Ann. Int. Symp. (1997), 199-205.
Johnson, K.O., The roles and functions of cutaneous mechanoreceptors. Curr. Opinion Neurobiology 11 (2001), 455-461.
Scheibert et al., The Role of Fingerprints in the Coding of Tactile Information Probed with a Biomimetric Sensor. Science 323 (2009), 1503-1506.
Wellman et al., Mechanical design and control of a high-bandwidth shape memory alloy tactile display. Experimental Robotics 5 (1998), 56-66.
Watanabe et al., A method for controlling tactile sensation of surface roughness using ultrasonic vibration, IEEE Proc. Robot. Automat. 1 (1995), 1134-1139.
Matysek et al., Vibrotactile display for mobile applications based on dielectric elastomer stack actuators. Proc. SPIE 7642 (2010), 76420D.
Summers et al., A broadband tactile array on the fingertip. J. Acoust. Soc. America 112 (2002), 2118-2126.
Yobas et al., A novel bulk-micromachined electrostatic microvalve with a curved-compliant structure applicable for a pneumatic tactile display, J. Microelectromech. Syst. 10 (2001) 2, 187-196.
Fukuda et al., Micro resonator using electromagnetic actuator for tactile display, Int. Symp. on Micromechatronics and Human Science, 1997, 143-148.
Killebrew et al., A dense array stimulator to generate arbitrary spatio-temporal tactile stimuli. J. Neurosci. Methods 161 (2007), 62-74.
Taylor et al., A sixty-four element tactile display using shape memory alloy wires, Displays 18 (1998), 163-168.
Taylor et al., The design and control of a tactile display based on shape memory alloys. IEEE Proc. Robot. Automat. 2 (1997), 1318-1323.
Matysek et al., Tactile display with dielectric multilayer elastomer actuators. Proc. SPIE 7287 (2009), 72871D.
Chanter et al., Results from a tactile array on the fingertip, Proc. Eurohaptics 2001, Birmingham, 2001, 26-28.
Pasquero et al., STReSS: A practical tactile display system with one millimeter spatial resolution and 700 Hz refresh rate. Proc. Eurohaptics 2003, 94-110.
Kraus et al., An off-screen model for tactile graphical user interfaces. Lecture Notes Comp. Sci. 5105 (2008), 865-872.
Völkel et al., Tactile graphics revised: the novel BrailleDis 9000 pin-matrix device with multitouch input. Lecture Notes Comp. Sci. 5105 (2008), 835-842.
Paschew et al., High-resolution tactile display operated by an integrated 'Smart Hydrogel' actuator array. Proc. SPIE 7642 (2010), 764234.
Ramadan et al., A review of piezoelectric polymers as functional materials for electromechanical transducers, Smart Mater. Struct. 23 (2014) 033001.
Paschew et al., Multimodal, high-resolution imaging system based on stimuli-responsive polymers, Adv. Sci. Technol. 82 (2013), 44-49.
Richter et al., Optoelectrothermic control of polymer-based highly integrated MEMS applied in an artificial skin. Adv. Mater. 21 (2009), 979-983.

* cited by examiner

SYSTEM AND METHOD FOR HAPTIC INTERACTION WITH VIRTUAL OBJECTS

The invention relates to a system and a method for haptic interaction with virtual objects.

Technologies for simulating reality, such as virtual reality (VR) and augmented reality (AR), offer never-before seen possibilities for expanding human perception. Although these days films can be experienced three-dimensionally in the movie theater, virtual reality will allow us to stand in the midst of these three-dimensional virtual worlds and observe them. For a realistic perception of VR/AR worlds, it is necessary for all the senses to be stimulated. Current systems that enable humans to interact with technical systems utilize the modalities of sight, hearing and touch to varying degrees.

To achieve a visual simulation of reality, three-dimensional and high-quality visualizations are necessary. This is accomplished using stereoscopic and 3D displays, which are available commercially in various designs. The technical challenge for use of such displays as a human-machine interface consists above all in fulfilling the demand for high visual realism, while at the same time providing real-time three-dimensional visualizations. Current developments in this field are primarily concerned with possible means for efficiently and rapidly processing large amounts of data, principles for presenting virtual information, and the real time-capable visualization of this information. The AVILUS and AVILUS+ projects focused in part on these efforts, and have already resulted in satisfying developments and viable methods. The Endoguide project is concerned with an endoscopic system that is capable of automatically generating an optical panoramic view for documentation and navigation purposes.

Realism can also be increased significantly by the additional presentation of three-dimensional acoustic information. A wide range of commercial systems are also already available in this field. It is highly likely that the next focus of development in virtual reality technologies will be the inclusion of contact-based, physical interaction of humans with their virtual environment. This would allow humans to experience the virtual world not only visually/acoustically, but also to touch anything in close proximity using their bare hands. However, the implementation of systems involving touch-based, physical interaction between humans and machines still presents a major challenge. Two different types of display systems exist.

Tactile displays are generally capable of conveying information regarding the characteristics of a virtual surface, in particular its contours, textures, relief and softness. However, the performance of commercially available systems is very limited and is focused on specific market segments.

Electrocutaneous displays (K. A. Kaczmarek, Electroactive adaptation on the abdomen: Preliminary results, IEEE Trans. Rehab. Eng. 8 (2000), 499-505) stimulate the user's skin using electrical vibrations (in FIG. 2, the surface of the tongue) generated by electrodes. Such displays are very simple and compact in design and can be miniaturized. They are capable of creating impressions with respect to contours and textures that can be readily localized. Due to practically unavoidable skin irritations and pain caused primarily by fluctuations in the resistance of the skin, few people can get used to this method of communicating information.

Vibrotactile displays (Y. Ikei, K. Wakamatsu, S. Fukuda, Texture presentation by vibratory tactile display, Proc. IEEE Virtual Reality Ann. Int. Symp. (1997), 199-205) generate mechanical vibrations on the display surface. These vibrations play an essential role in human tactile recognition. In exploring a surface, humans move a surface of their body over the surface at a characteristic sensing rate of approximately 12 to 15 $cms^{-1}$. The papillary lines of the fingertips initiate vibrations in the skin that are characteristic of the texture, typically in the range of approximately 10 to 400 Hz (K. O. Johnson, The roles and functions of cutaneous mechanoreceptors. Curr. Opinion Neurobiology 11 (2001), 455-461; J. Scheibert, S. Leurent, A. Prevost, G. Debregas, The Role of Fingerprints in the Coding of Tactile Information Probed with a Biomimetric Sensor. Science 323 (2009), 1503-1506). Broadband vibrotactile displays, which are capable of generating defined vibrations in this frequency range, therefore enable impressions of diverse textures to be conveyed.

Current research is pursuing various approaches to technical implementation of such displays, based, among other things, on shape memory actuators (P. S. Wellman, W. J. Peine, G. Favalora, R. D. Howe, Mechanical design and control of a high-bandwidth shape memory alloy tactile display. Experimental Robotics 5 (1998), 56-66), ultrasound (T. Watanabe, S. Fukui, A method for controlling tactile sensation of surface roughness using ultrasonic vibration, IEEE Proc. Robot. Automat. 1 (1995), 1134-1139), electroactive polymer actuators (M. Matysek, P. Lotz, K. Flittner, H. F. Sleek, Vibrotactile display for mobile applications based on dielectric elastomer stack actuators. Proc. SPIE 7642 (2010), 76420D), and piezoelectric actuators (J. R. Summers, C. M. Chanter, A broadband tactile array on the fingertip. J. Acoust. Soc. America 112 (2002), 2118-2126).

Vibrotactile systems, including especially for touch screens, have been offered by Immersion and Texas Instruments for a number of years and have already been used as haptic vibration systems in smartphones and smartwatches, which can convey information through vibrations of a different nature. These systems are based primarily on piezoelectric actuators, eccentric rotating mass (ERM), and linear resonance actuators (LRA). Despite their wide range of communicable textures and high technical feasibility, vibrotactile displays have not really achieved their full potential due to a significant disadvantage: Vibrations are very difficult for humans to localize.

Static or displacement displays contain an actuator array that generates the tactile image information through changes in the individual actuator height. Because the virtual surface is directly simulated physically, all tactile information can be conveyed, in principle. The information presented can be localized, and contours and reliefs, but also very small structures or pressure distributions can be presented. The ability to convey textures is limited essentially by the miniaturization and integration limits of the actuator pixels and actuator arrays. Displacement displays are currently actuated pneumatically (L. Yobas, M. A. Huff, F. J. Lisy, D. M. Durand, A novel bulk-micromachined electrostatic microvalve with a curved-compliant structure applicable for a pneumatic tactile display, J. Microelectromech. Syst. 10 (2001) 2, 187-196), electromagnetically (T. Fukuda, H. Morita, F. Arai, H. Ishihara, H. Matsuura, Micro resonator using electromagnetic actuator for tactile display, Int. Symp. on Micromechatronics and Human Science, 1997, 143-148; J. H. Killebrew, et al., A dense array stimulator to generate arbitrary spatio-temporal tactile stimuli. J. Neurosci. Methods 161 (2007), 62-74), using shape memory elements (P. M. Taylor, A. Moser, A. Creed, A sixty-four element tactile display using shape memory alloy wires, Displays 18 (1998), 163-168; P. M. Taylor, A. Moser, A. Creed, The design and control of a tactile display based on shape memory alloys. IEEE Proc. Robot. Automat. 2 (1997), 1318-1323), electroactive polymer actuators (EAP) (M. Matysek, P. Lotz, H. F. Schlaak, Tactile display with dielectric multilayer elastomer actuators. Proc. SPIE 7287 (2009), 72871D), or piezoelectric actuators (C. M. Chanter, I. R. Summers, Results from a tactile array on the fingertip, Proc. Eurohaptics 2001, Birmingham, 2001, 26-28; J. Pasquero, V. Hayward, STReSS: A practical tactile display system with one millimeter spatial resolution and 700 Hz refresh rate. Proc. Eurohaptics 2003, 94-110). Motivated by the need for tangible graphics by blind and visually impaired people, highly integrated displacement displays with a large display surface have been developed in cooperation with TU Dresden. The BrailleDis 9000 system, which is based on a modified Braille cell module platform with piezoelectric bimorph actuators, has 7200 (120×60) pins (M. Kraus, T. Völkel, G. Weber, An off-screen model for tactile graphical user interfaces. Lecture Notes Comp. Sci. 5105 (2008), 865-872; T. Völkel, G. Weber, U. Baumann, Tactile graphics revised: the novel BrailleDis 9000 pin-matrix device with multitouch input. Lecture Notes Comp. Sci. 5105 (2008), 835-842) and provides visually impaired people with a graphics-based communication interface for the first time.

Despite their extraordinary use advantages, displacement displays are currently limited practically to applications for the visually impaired. Current technical approaches have fundamental disadvantages in terms of their capacity for miniaturization, their achievable degrees of integration, and their grid dimensions, as well as their cost, since most of them involve complex, high-precision mechanical designs. They are unsuitable for the realization of integratable dynamic tactile surfaces with high local resolution.

Also known are displacement displays in the form of large-scale integrated, monolithic, microfluidic displays with active components based on intrinsically active polymers (DE 10226746 A1), in which the current integration density is more than 1,000 actuators per $cm^2$. These displays are transparent, only one millimeter thick, and can be embodied as flexible (A. Richter, G. Paschew, Optoelectrothermic control of polymer-based highly integrated MEMS applied in an artificial skin. Adv. Mater. 21 (2009), 979-983; G. Paschew, A. Richter, High-resolution tactile display operated by an integrated 'Smart Hydrogel' actuator array. Proc. SPIE 7642 (2010), 764234). The minimum writing time for the display is in the range of 400 ms.

Kinesthetic displays convey realistic impressions to the user for the manipulation of virtual objects by imparting dynamic mechanical effects on the person with their effectors. They are control loops, i.e. a person should also be able to influence the virtual world through these systems. Kinesthetic displays stimulate the kinesthetic sensors of people, which convey impressions about the internal condition of a body part through joint angles and muscle tension. Moreover, it is possible to bring dynamic events to life via vibrations of the kinesthetic display. There are three embodiments of kinesthetic displays: (1) active joysticks, (2) force feedback displays (FFD, mostly electromechanical steering wheels or hand exoskeletons), and displacement feedback displays (DFD, electromechanical arm exoskeletons), which include larger body parts, e.g. the arm, in the display system. A number of commercialized products (e.g. Cyberglovesystems, Geomagic), most of which are coupled to 2D screens (Phantom Premium 3.0 by Geomagic), already exist in these areas. Most advanced are the combined systems, such as the Immersive Touch system, in which an active joystick in the form of a stylus is coupled to a visual 3D display, allowing users to touch the surface of a virtual object with this stylus and, by moving the stylus over the object, to receive information about the shape and surface texture of the object.

Mobile electronics with touch displays, such as smartphones and tablets, offer vibration feedback to confirm actions. In general, the technologies of intermodal and tactile displays are still at an early stage of development and are not yet capable of serving as a platform for new methods and technologies.

For the technologies of virtual reality (VR), it is an essential disadvantage that the prior art offers virtually no means of interacting with virtual objects directly on a tactile basis, i.e. handling them with bare hands, for example. Rather, a tool in the form of a force feedback display or a displacement feedback display is always required. In the simplest cases, for example, in a driving simulator, a steering wheel is manipulated vibrationally with the film or is manipulated synchronized with the film based on torque. Toys in the adult entertainment industry (teledildonics or cyberdildonics) operate according to a similar principle, for example, vibrators are actuated via partially wireless data links, synchronized with a film or with VR sequences, or are stimulated alternately by partners in social networks. The haptic information that can be conveyed in such cases is very limited.

The most powerful systems to date use force feedback or displacement feedback systems to allow users to touch a virtual object and explore its shape indirectly by means of a tool. Using force feedback systems in the form of gloves, which can define the degrees of freedom of the user's fingers, simple virtual objects such as cubes or spheres can be grasped. Another system, the Phantom system by Geomatic, has a force feedback system in the form of a stylus which the user holds in his hand. Using an active mechanism, usually a lever arm mechanism, the stylus can be manipulated by the user to explore the surface and shape of a virtual object.

Also known, for example, is JP H08-257947 A, which discloses a tactile display for conveying haptic characteristics of virtual objects. This display allows the user to contact the object by means of only a fingertip, which is not sufficient to gain a haptic impression of an entire object. Furthermore, the movement of the hand is captured by means of an implement positioned on the arm of the user. With these limitations, it is not possible to generate an overall perception.

EP 2827224 A1 describes a system and a method that make it possible to concretize virtual, visual 3D objects so that they can be touched directly by the user with his bare hands. Three-dimensional data of the user or the body part of interest are captured, along with data about the virtual three-dimensional object (which can also be calculated); both are processed by data processing means and are then presented combined, synchronized with one another and rendered in high quality in a visual 3D subsystem. The user then sees his body part, e.g. his hands, rendered in a direct, defined spatial relationship with the virtual 3D object.

At the same time, the haptic subsystem, which comprises a positionable and deformable tactile display, presents the surface shape and surface characteristics of the virtual object.

Collision point prediction or determination ensures that by appropriately positioning the tactile display, the user will touch the virtual object precisely at the visually correct moment, and the correct tangible surface characteristics around the collision point are displayed, so that the user and virtual object are synchronized with one another. The user thus has an overall perception of the virtual object, and can see and feel the virtual object, which for him is now concretized and actually exists, while he is in fact touching the correspondingly positioned tactile display.

The disadvantage of this system is that the need to position the visual subsystem and the haptic subsystem at a defined distance from one another in order to generate an overall perception gives the system limited usability. Moreover, the system is only capable of displaying objects of a specific size and shape, and cannot present a haptic display of any desired virtual 3D object. Furthermore, the static configuration of the visual subsystem does not permit free positioning of the object in space. A combination with the haptic display technologies of the prior art also would not be expedient here, since the inadequate display capabilities and/or functions of these technologies make them incapable of concretizing any desired or at least a wide range of virtual 3D objects and thus presenting them in tangible form.

It is therefore the object of the present invention to provide a system and a method for interacting with or concretizing virtual three-dimensional objects, which overcome the disadvantages existing in the prior art.

The object is achieved by the independent claims. Advantageous embodiments are specified in the dependent claims.

The system of the invention is based on the idea that, for the haptic representation of any virtual three-dimensional object—synchronized with the visual representation—only the tangible haptic characteristics of the surface area of the object at the collision point or the area of contact are important. The haptic display system (morphling) of the invention that displays these characteristics comprises in principle three functional groups, which operate synchronously with one another and with a visual subsystem:

(1) a deformable, shape changing, tactile display, which conveys surface-based tangible characteristics such as textures, contours, reliefs, object heat, resiliency (softness), and moisture, (2) a positioning device, which moves the tactile display to the position of the surface segment or surface section of a virtual 3D object in three-dimensional space to be displayed in tangible form, and (3) a deformation mechanism, which adjusts the deformable tactile display to the shape of the object surface segment being displayed.

The individual subsystems can be operated statically or dynamically. In dynamic operation, users can change the position and/or shape, for example, of the tactile display by touching it. In embodiments of the invention, the haptic display system includes a device for positioning in three-dimensional space. This device allows the tactile display unit to be positioned where the user wishes to touch the 3D virtual object. The positioning device can, if required, track the tactile display unit based on the surface shape of the virtual object, and adjust its position in space. This tracking and adjustment can correspondingly be carried out synchronously with the change in the point(s) of contact by the user (dynamic operation). It is thereby possible, when combined with the deformation mechanism, to display objects of larger dimensions and nearly any shape haptically. To allow the user to move within larger spaces, the device can be arranged on a movable chassis. Positioning in three-dimensional space is preferably carried out in real-time and synchronously with the visual presentation of the object, to enable a realistic overall perception.

In conjunction with the tactile display, the positioning of the tactile display can also be used to simulate certain surface-based tangible characteristics of the virtual three-dimensional object by following, or only partially following, the contact point or points synchronously with a movement by the user, or by performing a movement relative thereto.

In embodiments of the invention, the device for positioning in the three-dimensional space of the tactile display subsystem is designed as a robotic arm, a delta robot, a multi-axis system, or a hexapod.

In embodiments of the invention, the device for positioning in the three-dimensional space of the tactile display subsystem is designed as a combination of robotic arm, delta robot, and hexapod. Such a device enables the tactile display subsystem to be positioned as required, with the movement of the system in the X-Y direction being carried out by means of a hexapod, for example, and the positioning in the Z direction by means of the robotic arm.

In embodiments of the invention, the device for positioning in the three-dimensional space of the tactile display subsystem is designed with combinations of axes, linear drives, and/or rotary drives, the mode of operation and degrees of freedom being coordinated with one another so as to implement positioning of the tactile display subsystem in the X, Y, and Z directions with the necessary precision and speed.

In embodiments of the invention, the device for positioning in the three-dimensional space of the tactile display subsystem is designed as a chamber system. In this system, the device has a plurality of chambers, the volume of which may be adjusted by adding or removing fluids (gas or liquid). By adding a defined amount of the fluid, an increase in volume can be achieved. Conversely, a volume decrease is achieved by removing fluid. The fluid may also be added in a targeted manner by supplying fluid selectively to individual chambers, according to the requirements of the object's shape. This configuration enables the shaping of cavities, for example.

For the purposes of the present invention, the specifications regarding the X direction, Y direction, and Z direction refer to the axes of a Cartesian coordinate system.

In one embodiment of the invention, the tactile display system is designed as having a deformable tactile display and a device for the deformation thereof. The job of the tactile display is to present the tactile surface characteristics of the virtual object in the area of the collision point, i.e. the point at which the user wishes to touch the virtual object. This refers in particular to impressions of surface texture, contours, e.g. raised lines or trenches, relief, softness, object heat, and moisture.

In one embodiment, the tactile display system includes a segmentation or subdivision into a plurality of elements, the behavior of which can be controlled independently of one another. This makes it possible to position one of these elements under each finger or at different locations on the human body or under each hand.

In one embodiment, the tactile display comprises a vibrotactile display functionality. This enables the display to convey impressions of diverse surface textures to the user, including to a limited extent reliefs and softness (resiliency), by varying the oscillation frequency of the ideally broadband tactile display element.

In embodiments of the invention, the haptic display system has at least one device for generating oscillations that produce a tangible vibration in the tactile display or in selected subcomponents of the tactile display. The device for generating oscillations may be designed to produce vibrations by piezoelectric, magnetostrictive, electrodynamic, electrostatic, electromechanical, electromagnetic, pneumatic, or hydraulic means. In addition to conventional effect carrier materials, polymeric effect carriers, for example piezoelectric polymers in the form of bulk piezoelectric polymers, polymer composites, or voided charged polymers, are of great interest due to their potential mass advantages and their mechanical flexibility; such polymeric effect carriers are described in detail, e.g. in [K. S. Ramadan, D. Sameoto, S. Evoy, A review of piezoelectric polymers as functional materials for electromechanical transducers, *Smart Mater. Struct.* 23 (2014) 033001]. Other suitable polymer options include dielectric elastomer actuators, for example based on polydimethylsiloxane (PDMS), polyurethanes, or acrylate polymers, which likewise offer low mass, elastic characteristics and a good frequency bandwidth.

In one embodiment, the tactile display includes a segmentation or subdivision into a plurality of vibrotactile elements, the oscillation behavior of which can be controlled independently of one another. This allows the tactile display to display locally different surface characteristics in the area of contact with the user. This is important particularly when the user actually moves his hand over the display surface, for example. In that case, the haptic surface characteristics of the virtual object in the contact area must be displayed with the necessary in-plane resolution. When combined with the deformation device and the positioning device, certain surface-based tangible characteristics of the virtual three-dimensional object can be simulated. For instance, the impression imparted by an object is determined by its elasticity, i.e. its resiliency in the micro- and macro-ranges. A movement of the hand and/or the finger relative to the surface of the object will convey the object's texture. This can be simulated both by the frequency, amplitude, and phase of the vibrotactile elements and by a predefined texture in conjunction with the speed of the relative movement between the tactile display and the user.

In a further embodiment of the invention, the tactile display has no subdivision of the vibrotactile display functionality. Segmentation can be dispensed with, for example, if the user moves his hand only virtually over the object surface, i.e. he sees and feels as if he is sweeping his hand over the surface of the 3D virtual object, but the positioning device is actually tracking the surface segment presented by the tactile display in real time. Thus, his fingers actually remain virtually at the original collision points. To display the variable textures and other surface characteristics at the collision points, the frequency of the entire vibrotactile display can be dynamically adjusted. Expressed more clearly: If it appears to the user that he will be moving his hand over a rough surface, for example, the tactile display will alter its vibration frequency at the synchronized moment, so that the user will feel the difference in roughness. He will not notice that his fingers effectively do not change their position on the tactile display at all. In this case, it is possible in one embodiment of the invention that the tactile display does not necessarily have to be embodied as deformable. For example, if only one finger is used with the display, it is sufficient for the positioning device to position the tactile display in real time, at the position and the correct x, y, z angle of inclination to display the virtual surface segment of the virtual 3D object, and to always display the correct texture frequency, surface position, and surface inclination corresponding to the location of the moving finger by tracking it appropriately, so that the user receives impressions of the surface texture and surface shape through his finger.

In one embodiment of the invention, the tactile display comprises elements that generate the texture of the 3D virtual object, in which the elements operate according to the buckling effect. A deliberate mechanical tensioning or relaxation of an elastomeric surface causes this surface to fold in a defined manner (English: buckling) and to generate a well-defined and regularly textured surface structure even on larger surfaces. Comparable effects can also be achieved by adjusting the tangible roughness of a rough surface structure by means of an elastic layer located thereabove, by which the raised rough areas are covered in a defined manner to a greater or lesser degree.

In embodiments of the invention, subcomponents cooperate to form a tactile display. This can consist not only of a vibrotactile display or buckling effect display, or a combination of such subcomponents, but also of a combination of vibrotactile or buckling effect displays with at least one static display.

In embodiments of the invention, the surface condition is presented by static displays.

In embodiments of the invention, the static display has subcomponents designed as actuator pixels, known as taxels (tactile pixels). Actuator pixels allow tactile information to be displayed. Due to their small dimensions, it is possible to display various tactile features with high resolution, in particular contours, reliefs, and, with suitable resolution, textures.

In embodiments of the invention, the static display has a matrix of taxels. The actuator pixels can be formed, for example, based on intrinsically active polymers. This allows intermodal displays to be created, which, due to their high resolution of currently up to 625 individually controllable actuator pixels per $cm^2$ and their multimodality, are capable of physically simulating surfaces with extraordinary precision, which previously was technically unfeasible. In addition to optical functionality, the modalities of the taxels include the tactile parameters of taxel volume, taxel height, and taxel softness, each of which can be modulated by nearly one order of magnitude. A display based on these actuator pixels can therefore convey impressions of a virtual surface in terms of contours, reliefs, textures, and softness [G. Paschew, R. Körbitz, A. Richter, Multimodal, high-resolution imaging system based on stimuli-responsive polymers, *Adv. Sci. Technol.* 82 (2013), 44-49].

In embodiments of the invention, taxels are formed from polymers, the phase transition behavior of which can be influenced by ambient variables. Ambient variables in this case may include physical parameters, such as pressure, temperature, and illuminance, or chemical parameters, such as pH and osmotic pressure. These ambient variables influence the phase transition behavior of the actuator pixels at least in the region of the point of collision of the user with the tactile element, so that the actuator pixels can reproduce the structural conditions of the object on the display. Information regarding the density, pressure, deformability, and surface configuration of the object can also be made accessible to the user by means of the tactile display.

In embodiments of the invention, the actuator pixels are formed from stimuli-sensitive hydrogels, which are designed to be influenced in terms of their volume phase transition behavior by introducing electrical, chemical, or thermal energy. The introduction of electrical, chemical, or thermal energy influences the phase transition behavior of the hydrogels such that a change in the phase behavior, and thus a direct change in the mechanical characteristics of the hydrogel in the taxel, takes place. In this way, information regarding the condition of the object, at least at the collision point, can be reproduced in a targeted manner by the tactile element.

In embodiments of the invention, the tactile display has subcomponents of different configurations. This allows diverse tactile impressions to be conveyed to the user. The individual subcomponents are designed, for example, as an actuator pixel matrix and are actuated as needed in order to reproduce the tactile characteristics of the object.

In embodiments of the invention, the tactile display includes subcomponents that are designed as controllable by capacitive, piezoelectric, electrodynamic, electromagnetic, or magnetostrictive means, or as dielectric elastomer elements. In that case, the subcomponent comprises electrically capacitive, piezoelectric, magnetic, current-carrying, or magnetostrictive bodies, designed as actuators that can be controlled by the targeted application of an electric or magnetic field.

In embodiments of the invention, the tactile display has subcomponents that form a mechanical texturing of their surface. This allows different roughness impressions of the object's surface to be reproduced.

In embodiments of the invention, the tactile display includes subcomponents that are designed to act pneumatically on the hand or other body parts of the user at the collision point. This action can be implemented as an overpressure or an underpressure.

In embodiments of the invention, the tactile display and/or the subcomponents are designed as temperature-controllable. In that case, the tactile display as a whole or the individual subcomponents can be designed as selectively temperature-controllable. This allows thermal material characteristics, for example, such as the thermal capacity of the object and temperature differences at transition points between two different materials, to be reproduced. The temperature of the virtual object can likewise be adapted to the virtual environment of the object. The impression of reality is thereby enhanced.

In embodiments of the invention, the tactile display and/or the subcomponents are designed such that they can be moistened. In that case, the tactile display as a whole or the individual subcomponents can be designed to be moistened in a targeted manner. This allows the system to convey an impression of moisture to the user at the collision point.

In embodiments of the invention, the deformable, mechanically flexible tactile display is combined with a deformation mechanism. This mechanism has various subcomponents, which are designed to be positioned variably relative to one another. The position of these individual subcomponents can be adjusted, for example, such that the tactile display can mimic the surface shape of the object or a portion of the surface shape in real time for interaction with the user, for the virtual representation of an object.

In embodiments, the deformation mechanism is designed such that its subcomponents can be tilted relative to one another.

In embodiments of the invention, the deformation mechanism is designed such that the positions of the individual elements can be controlled by means of a locking mechanism or a change in the friction of the guide thereof. This locking in place can be achieved, e.g. by means of fluidic or other mechanisms on the guides of individual elements that change either the friction characteristics of the guide.

In embodiments, locking can be achieved by clamping the elements in the guide, with a force F acting at certain points or as a surface load F/A over an area A of the rod element. The force may be supported, for example, by a unimorph or bimorph, by a volume actuator in a melt, hydraulic, or pneumatic pouch, by a piezoelectric or phase converter, which is supported by special structures, e.g. as in by a shape support or a surface with increased friction. In that case, the contact surface can be enlarged by means of a special cross-section, designed, for example, as trough-shaped or as trapezoidal. With electrostatic locking, the rod element forms one electrode and the locking element forms the second electrode, and a voltage is applied between the two electrodes. If a phase converter is used, a meltable substance can advantageously be used. After setting, the structure is vibration-resistant. In an embodiment involving an electrorheological or magnetorheological fluid, friction can be controlled electrically or magnetically.

In embodiments of the invention, the subcomponents of the deformation mechanism are designed as articulated joints. These can be designed as spherical joints, for example, allowing the positioning of the subcomponents relative to one another to be adjusted easily. In variants of these embodiments, the joints are designed such that they can be locked or stiffened as required. This allows hard surfaces to be better simulated, since stiffening reduces the elasticity of the haptic element.

In embodiments of the invention, the subcomponents of the deformation mechanism are designed such that their dimensions can be varied by increasing or decreasing their volume. For example, the intermediate elements can be designed as swellable elements that swell upon contact with a fluid, and consequently experience a volume increase. As a result, the distance between the subcomponents surrounding the intermediate element increases. The intermediate element can also undergo a volume increase or decrease by pneumatic or hydraulic means. For example, the subcomponents may be formed as a hydrogel which undergoes a thermally controlled volume increase or decrease. The change in volume and the resulting dimensional and/or shape change in the subcomponents leads to a defined deformation of the tactile display.

In embodiments of the invention, the deformation mechanism of the tactile display includes a carrier substrate, which is designed to hold one or more actuating elements. Said carrier substrate can be designed, for example, such that the actuating element can be positioned in the X-Y direction. Particularly in cases involving a plurality of actuating elements, the actuating elements can be positioned in a defined manner over the carrier substrate.

In embodiments of the invention, the deformation mechanism is designed as an actuating element. In that case, the actuating element can be formed from a multiplicity of actuating subcomponents. These actuating subcomponents can be designed as annular, for example. This allows circular depressions in the object to be reproduced, for example.

If the movement of the linear actuators is transmitted to supporting rings or rigid supporting rods, and if these serve as movable support points for a flexible linkage structure, then certain surface structures of the object can be reproduced. The linkage structure can in turn serve as a carrier for a haptic display.

In embodiments of the invention, the actuating subcomponents are designed in the form of rods. These rod-shaped actuating subcomponents are designed as height-adjustable, for example, so that the rod-shaped actuating subcomponents can be used to adjust to different height positions in the Z-axis direction. One example of an embodiment of the rod-shaped subcomponents is a rod cushion. The rod-shaped actuating subcomponents can be individually actuable, and the subcomponents are pneumatically or magnetically adjustable. Alternatively, the rod-shaped actuating subcomponents can also be individually controlled by means of a linear drive.

In embodiments of the invention, the actuating element is designed as a rod cushion, in which individual rods are arranged in the form of a matrix. The rods can be part of a translational or linear actuator. The rods are preferably individually actuable. The rods can be fixed in the Z direction pneumatically, electrostatically, electromagnetically, piezoelectrically, or magnetostrictively.

In embodiments of the invention, the rod-shaped actuating subcomponents are designed such that the subcomponents are positioned utilizing gravitational force. The subcomponents can then be positioned by means of a device, for example counter to gravitational force, or can be positioned in the required position counter to gravitational force by an application of force. The position in this case is the arrangement of the rod-shaped element in the Z direction. This securing in the vertical position is accomplished by means of a locking mechanism.

In embodiments of the invention, the rod-shaped actuating subcomponents are held in a matrix structure by a mounting plate, and can move in the z direction or can be locked in place in this mounting plate.

In embodiments of the invention, the rod-shaped actuating subcomponents are held in the intended position in the mounting plate by means of a frictional element or a resilient element or a combination of a resilient element and a frictional element. The resiliency and friction are adjusted according to the characteristics of the object to be simulated. By applying compressive force to the rod-shaped actuating subcomponents, which is generated when the user touches the subcomponents, the rod-shaped actuating subcomponents can be displaced, and their resiliency can return them partially or fully to their initial position. The locking device can be designed as piezoelectric, magnetostrictive, electrodynamic, electrostatic, electromechanical, electromagnetic, pneumatic or hydraulic.

In embodiments of the invention, before positioning, the rod-shaped actuating subcomponents are placed in a defined initial position by a resetting mechanism. Resetting can be accomplished by means of a flat plate (resetting plate), for example, which moves in the direction of the mounting plate until the reset position is reached. Shaping can then be accomplished by means of a die, which has a positive or a negative shape depending on the side on which shaping is performed, with the die moving relative to the rod-shaped actuating subcomponents in the direction opposite the resetting direction.

In embodiments of the invention, the die is designed as a multi-chamber system according to the invention.

In embodiments of the invention, the rod-shaped actuating subcomponents rest against the die even after being positioned during representation of the object. The die generates the tangible resiliency and friction (the viscoelastic characteristics) of the represented object when the user presses on the represented object with his finger or hand.

In embodiments of the invention, the rod-shaped actuating subcomponents are positioned with the help of gravitational force or another force, in that the resetting plate moves away from the mounting plate in the direction of gravitational force, or moves away in the transverse direction (laterally), tilted in the transverse direction, and the individual rod-shaped actuating subcomponents are held or locked in place upon reaching their intended position.

In embodiments of the invention, the rod-shaped actuating subcomponents are positioned with the help of gravitational force via a timer. For this purpose, all rod-shaped actuating subcomponents are fixed at the reset position, the resetting plate is positioned, and the rod-shaped actuating subcomponents are then locked in place individually or released collectively. When the individual rod-shaped actuating subcomponents move as a result of gravitational force, they are locked or held in place once the time required to reach their intended position elapses. In embodiments of the invention, the rod-shaped actuating subcomponents are designed such that the subcomponents are at least partially elastically deformable. For example, the subcomponents can have resilient regions, which give the device elasticity for deformation. In that case, it can be advantageous for the elasticity of the individual actuating subcomponents to be designed as specifically adjustable.

In embodiments of the invention, the rod-shaped actuating subcomponents are arranged in the form of a grid. The subcomponents can thereby form a matrix in which the individual subcomponents are designed as actuable. This enables diverse topographies of the object to be realized by means of the haptic element.

In embodiments of the invention, the rod-shaped actuating subcomponents are laterally adjacent to one another. The subcomponents can thereby form a matrix, and are positioned with the help of a die, for example.

In embodiments of the invention, the actuating element is designed as a combination of annular components and rod-shaped subcomponents. The rod-shaped subcomponents are arranged on the annular components, for example.

In embodiments of the invention, the device for deformation is designed as a multi-chamber system. This multi-chamber system is designed as having a multiplicity of chambers of a defined volume, in the form of a matrix. By selectively filling the chambers, a selective increase in volume can be achieved, allowing diverse height differences in the Z direction to be generated. In addition to a matrix in the X-Y direction, the multi-chamber system preferably has at least two, and preferably more, positions of the defined chambers in the Z direction. This enables raised areas to be generated in the Z direction in a simple manner. To accomplish this, the chambers are selectively filled in a targeted manner with a fluid (liquid or gas). This allows complex geometries of the object to be presented. It is likewise possible, according to the requirements for representing the object, to remove fluid from the multi-chamber system. The multi-chamber system is then subsequently available for a new selective filling.

In embodiments of the invention, the multi-chamber system is designed such that the chambers can be individually filled pneumatically, fluidically, hydraulically and/or with granular materials.

Complex geometries, such as depressions and cavities for example, can be represented by means of the multi-chamber system. The multi-chamber system preferably presents the complex geometries, while the haptic element conveys the haptic surface impression of the object. In embodiments of the invention, the individual chambers of the multi-chamber system are designed to be filled differently. The different filling of the chambers allows individual haptic surface configurations of the tactile display to be established in a targeted manner. The differently filled chambers can be actuated individually or simultaneously.

The resiliency of the chambers can be modified by way of the characteristics of the material of the vertical and horizontal chamber walls, together with the filling pressure and the filling material or gas. This allows both very soft and hard surfaces to be displayed. In embodiments of the invention, vacuum pressure is used to adjust the surface characteristics. This enables the surface characteristics to be adjusted, for example in combination with the filling of the individual chambers in the multi-chamber system.

By filling the chambers with liquids or materials, for example granular materials such as powders whose characteristics can be altered electrically, magnetically, or thermally, for example a magnetorheological fluid, the tangible haptic characteristics of an object can be presented in the surface area.

In embodiments of the invention, the surface of the tactile display is stiffened. For instance, the surface of the tactile display can be stiffened via the targeted filling with liquids.

In embodiments of the invention, the surface of the tactile display is stiffened by means of a mechanical stiffening mechanism. This can be plate-shaped or lamellar, for example.

In embodiments of the invention, the tactile display can be preformed according to an object's geometry. This is suitable particularly for applications in which the nature and thus the approximate size and shape of the virtual object is defined in advance, for example by the virtual environment. The predefined virtual object can also be changed with the help of the positioning unit.

The positioning and deformation of the haptic element are preferably carried out in real time. That means that users and objects that are actually spatially separated are displayed virtually in the visual system in spatial proximity, and that upon collision with the hand, the haptic element is located at that point and has assumed the shape of the virtual object.

Overall System

A further aspect of the invention relates to a system for interacting with virtual objects, comprising:

at least one first device for capturing three-dimensional data of at least one user, a device for capturing three-dimensional data of at least one object, at least one data processing device for processing in real time the captured three-dimensional data of the user, and for generating a visual representation of the three-dimensional data of the user, a data processing device for processing in real time the captured three-dimensional data of an object, and for generating a visual three-dimensional representation of the object in real time, at least one visual subsystem with a display device for the visual and synchronized representation of the three-dimensional data of at least the object and the user, and at least one tactile display system according to the invention for interaction with the user.

The three-dimensional data of the user are preferably captured from those body parts that will be used to interact with the virtual object. Advantageously, the position and the force exerted between the body part of the user and the tactile display system are also captured. In addition, three-dimensional data about objects that are located in the field of view may also be captured.

In embodiments of the invention, acoustic devices are provided, which transmit an acoustic representation of the object to be displayed.

In embodiments of the invention, a plurality of haptic display systems is provided, which can be switched out as needed for presenting the virtual object. For instance, it is conceivable for the haptic display systems to be designed such that they form basic structures for representing the virtual objects. Such basic structures can form complex shapes such as hollow bodies, or spherical or concave or convex shapes, for example. Users can switch between these different display systems according to the requirements for haptic representation, by means of a device for switching between the haptic display systems.

With regard to the real-time representation of the three-dimensional data of the user, at least the body part that is interacting with the object, e.g. the hand, must be represented in the visual system; the body part may also be directly visible, as with a head-up display. Ideally, all body parts of the user that lie within the user's field of view are visually displayed. With the synchronized real-time combination in the visual subsystem, users and objects that are actually spatially separated are displayed virtually in a defined spatial proximity. In this virtual representation, the user thus sees himself touching the virtual object. At the time of collision and at the collision point, however, he does not actually interact with the object represented in the visual system, but with a haptic display subsystem, the morphling, in a tactile subsystem which, in the tangible portion of the virtual object, displays the object's haptic characteristics, e.g. its surface condition and shape, synchronized in real time with the visual representation.

The interaction between the at least one body part of the visualized user and the visualized object are represented in the visual subsystem simultaneously with the interaction of the user with the tactile display system, and upon collision of the at least one part of the visualized user with the visualized object, a collision point is determined. The three-dimensional data of the object at the collision point of the at least one part of the visualized user with the visualized object are presented in the tactile subsystem, the haptic element having a surface with structuring that is designed such that the haptic element displays the three-dimensional structure of the object at the collision point based on the captured three-dimensional data of the object, at least in the area of the collision point.

A further aspect of the invention involves enabling the free positioning of the virtual object in space, which is not possible using the static configuration of the visual subsystem of the prior art (EP 2827224 A1). This is accomplished in that the visual subsystem according to the invention is designed to be arranged on the user. This ensures mobility and a free orientation in the displayed virtual space for the user. In contrast to known static display solutions, this gives the user free mobility, and enables free positioning of the object in the virtual representation. The visual subsystem can be designed as VR glasses (Zeiss VR One, Zeiss AG, Oberkochen) or as a VR headset (e.g. Oculus Rift, Oculus VR, LLC, Menlo Park, USA; Samsung Gear VR, Samsung Group, Seoul, South Korea; HTC Vive, High Tech Computer Corporation, Taoyuan, Taiwan; LG 360 VR, LG Electronics, Seoul, South Korea). An additional system functionality required in the described system configuration involves the real-time determination of the positioning of the user's head or his field of view, which comprises at least the rotation and inclination of the user's head and the user's spatial position relative to the virtual object. These functions can be an integral part of the VR-glasses or the VR headset.

Embodiments of the invention further comprise a device for capturing three-dimensional data of an object. Alternatively, the device for capturing the three-dimensional data of the user can also be designed such that the device can also capture the three-dimensional data of an object. The captured three-dimensional data are processed in the data processing device and a visual representation of the object is generated.

In embodiments of the invention, the first and/or second device for capturing the three-dimensional data is designed as a non-invasive imaging device. The quality of the information presented by the intermodal 3D perceptual system, also sometimes referred to as a 4D display, is determined in the clinical field, for example, not only by its performance, but also by the performance of the diagnostic imaging system that establishes the raw data. It is also conceivable to combine several of the imaging processes. For example, in the field of magnetic resonance imaging, hybrid methods are of interest which incorporate the results of other diagnostic methods into the intermodal information space. For example, details regarding brain activity in areas of the brain that are of interest can be acquired by means of functional magnetic resonance imaging (FMRI) or electroencephalography (EEG), whereas details regarding nerve fiber connections in the brain can be obtained from diffusion tests.

In embodiments of the invention, the first and/or second device for capturing three-dimensional data is selected from a group consisting of optical sensors in the IR, VIS and UV ranges, CCD cameras, CMOS sensors, impedance measurement, sonography, magnetic resonance imaging, scintigraphy, positron emission tomography, single-photon emission computer tomography, thermography, computer tomography, digital volume tomography, endoscopics, and optical tomography. In addition to spatial arrangements, magnetic resonance tomography and sonography also ascertain material information. For instance, sonography supplies information on anatomical details in B mode, on vascular flows in the Doppler process, and on mechanical tissue characteristics with acoustic radiation force impulse imaging (ARFI). The present system advantageously allows a simultaneous provision of these information dimensions to the user. This is accomplished in a form in which the user can use his natural near-field recognition method, the combined seeing-feeling process, to immediately and very accurately evaluate the information, just as if the object were actually in front of him. In so doing, differences such as certain material characteristics in the visual space are reproduced via pseudo-color presentations, textures and visual contrasts, for instance, and by the hardness, height, textures, reliefs, edges and tactile contrasts in the tactile area. The visual and haptic/tactile data channels that are coordinated with one another in terms of time generate the realistic impression for the user that the virtual object is actually in front of him and could be explored by feeling it with his hands.

In embodiments of the invention, the system further comprises a third device for capturing three-dimensional data of a user; the third device is designed to capture the eye movement of the user. The third device is used for tracking eye movement (eye tracking) in order to determine the viewing direction of the user. This is advantageous, since the visual subsystem also presents an image of the close environment. In this way, the user's impression of reality is strengthened to the effect that the difference between the virtual representation and the actual environment is largely eliminated, allowing the perception to be more strongly interpreted as real. Furthermore, tracking eye movement and determining the viewing direction enables the high-resolution visual representation in the visual subsystem to be limited to the area that is perceived by the user as his field of view. Adjacent areas that are perceived only partially or peripherally can be presented with less detail there, allowing the computation effort required for calculating the representation to be reduced. The use of a view-contingent system based on an eye tracker also makes it possible for the user to actuate certain supplemental functions, such as zoom, object rotation, etc., with his eyes.

In a further embodiment of the invention, the third device is a stationary system selected from a pan-tilt system, a tilting mirror system, and a fixed-camera system.

In embodiments of the invention, the system according to the invention is located in a low-stimulation environment. A low-stimulation environment is preferably understood as a space or chamber in which the entry of light and acoustic signals can be controlled, preferably minimized. This serves to support the formation of an overall perception. For example, it may be advantageous if the user is not able to visually perceive the system, in particular the tactile display, before use. The entry of outside noise may also be a hindrance in the formation of an overall perception if such noises are not consistent with the subject of the perception. Locating the system in the low-stimulation environment can thus advantageously support the formation of the overall perception.

With the system or device according to the invention, it is thus possible to make objects that are ordinarily inaccessible or difficult to access tangible.

A further aspect of the invention relates to a method for interacting with virtual objects using the system according to the invention, comprising the following steps:

capturing three-dimensional data of at least one user, and capturing the movement and the compressive forces and/or the mechanical stresses induced by the user at the collision point, processing the captured data about the movement and the compressive forces and/or the induced mechanical stresses, generating a visual real-time representation of at least one body part of the user based on the three-dimensional data of the user, generating a visual three-dimensional real-time representation of an object based on the three-dimensional data of the object, providing a synchronized real-time representation of the three-dimensional data of the object and of the at least one body part of the user in the visual subsystem according to the invention, the visualized three-dimensional data of the object being displayed with the visualized three-dimensional data of the user in the display device of the visual subsystem, wherein the interaction of the at least one part of the visualized user with the visualized object is represented in the visual subsystem, and the simultaneous interaction of the user is carried out with the tactile display system according to the invention, wherein upon collision of the at least one part of the visualized user with the visualized object a collision point is determined, along with the compressive force between the user and the display system, and the three-dimensional data of the object at the collision point of the at least one part of the visualized user with the visualized object is displayed in the tactile display system, wherein the tactile display system is designed to display the three-dimensional structure of the object at the collision point, based on the three-dimensional data of the object at least in the area of the collision point, and wherein the captured data about the movement and the compressive forces of the user control an in situ adjustment of the virtual representation of the object and of the visual representation of the hand movement in the area of the active field of view. The object can be either In embodiments of the invention, the at least one object to be displayed is captured in real time by a device for capturing three-dimensional data. This makes it possible, for example, for the user to interact with an actual object in a separate location. In that case, the three-dimensional data of the object are captured at a first location and the three-dimensional data of the user are captured at the second location. The representation of the object and of the user in the visual system is then generated. It is also possible to capture moving objects and to present the movement in the visual and/or tactile subsystem.

In embodiments of the invention, the method further comprises capturing eye movements of the user, processing the captured eye-movement data and determining the active field of view of the user, implementing the captured eye-movement data and the active field of view in the visual subsystem, the captured eye-movement data of the user providing a local adjustment of the visual representation of the subject and of the visual representation of the hand movement in the area of the active field of view.

A further aspect of the invention relates to the use of the system according to the invention in a method according to the invention for interacting with virtual objects.

The aforementioned embodiments of the invention are suitable for achieving the stated object. Combinations of the disclosed embodiments are also suitable for achieving the stated object. Preferred refinements of the invention result from combinations of the claims or individual features thereof.

The invention is explained in greater detail below with reference to a number of exemplary embodiments and the associated figures. The exemplary embodiments are intended to describe the invention, without limiting it.

BRIEF DESCRIPTION OF THE DRAWINGS

In the figures,

FIG. 4A illustrates an embodiment when all of rod elements 22 are touching die 21. FIG. 4B illustrates an embodiment in the reset position. FIG. 4C illustrates an embodiment where each of rod elements 22 is locked in place by securing mechanism 20 upon reaching its intended position.

FIG. 5A shows a linear actuator 17 or a hydraulic or pneumatic device contains the securing mechanism; (ii) FIG. 5B shows locking is effected by clamping, in which a force F acts on the rod element at specific points or as a surface load F/A over an area A; (iii) FIG. 5C shows that locking is effected by a unimorph or bimorph 42; (iv) FIG. 5D shows that by a volume actuator (locking element) 43 in a melt or hydraulic or pneumatic pouch 44; (v) FIG. 5E shows a piezoelectric or phase converter 45; (vi) FIG. 5F shows support by special structure; and (vii) FIG. 5G shows a close-up view in the form of a shape support or a surface with increased friction 46.

FIG. 8A illustrates an embodiment of the haptic display system (morphling) 4 consisting of a flexible mechanical structure with flexible bending rods or bending bars 32 which, held by means of fixed supporting rings 33 of different diameters.

FIG. 8B illustrates an embodiment of the haptic display system (morphling) 4 consisting of a flexible mechanical structure with flexible bending rods or bending bars 32 which are held by rigid supporting rods 34.

FIG. 8C and FIG. 8D show sectional views AA with various deflections of the actuators.

FIG. 8E and FIG. 8F show sectional views BB with various deflections of the actuators.

FIG. 8G illustrates the flexible rod construction supporting rigid tactile display elements 36.

FIG. 8H illustrates an exemplary embodiment, where an elastomechanical layer 37 is used in place of supporting rings 33 or supporting rods 34, which is flexible but assumes a uniform shape, and at the same time possesses the stability for suitable vibrotactile surface output.

FIG. 8I illustrates an exemplary embodiment that may contain an array of local actuators 38 that provide additional local deformation, where local actuators 38 can support or replace the vertical actuating deformation.

FIG. 8J illustrates an exemplary embodiment where the 3D support structure is formed by surface elements (links) 39, connected to one another via joints 40.

FIGS. 9A-9F show a structure for this purpose, which is located on the tiles and which changes, and FIGS. 9G-9I show tile intermediate spaces configured for this purpose. Three design variants are shown in the figures. FIG. 9A and FIG. 9D show an edge formation or presentation by displacement, FIG. 9B and FIG. 9E show an edge formation by rotation or tilting, and FIG. 9C and FIG. 9F show an edge formation by an increase in spacing. FIG. 9G illustrates a tangible edge display generated using an intermediate space fluid, e.g. a magnetorheological fluid. The hardness, the viscous characteristics, and the coefficient of friction in the intermediate spaces are varied, and the haptic elements 36 (tiles) are suitable for generating electric or magnetic fields. In this way, the volume of the intermediate space is changed, thereby raising or lowering it. If gases are used, the temperature is changed accordingly for this purpose. FIG. 9H shows an edge curvature change produced by adjusting the volume of the solid model, while FIG. 9I shows a change in edge curvature produced by adjusting the intermediate space. In this variant, the spacing or the position of the tiles is varied, and as a result, the enclosed fluid (air, liquid) is partially or fully raised or lowered.

In a first exemplary embodiment, FIGS. 1A-1C illustrate the basic principle behind the concretization of any virtual three-dimensional object. FIG. 1A shows a schematic representation of the virtual three-dimensional object 1. For the haptic representation of any virtual three-dimensional object 1, such as a pitcher, synchronized with the visual representation, only its tangible haptic characteristics in the portion of the surface at collision point 2 or its contact area are important. Only this portion 2 of the surface, for example, will be touched by the user's hand 3. Morphling 4 presents, in real time, the haptic conditions of virtual 3D object 1 for this portion 2 of the surface. As illustrated by FIG. 1B and FIG. 1C, morphling 4 consists in principle of three functional groups which operate in synchronism with one another and with the visual subsystem: (a) a positioning device 5, which places a tactile display unit 6 at the position of the surface segment or section 2 of the virtual 3D object to be displayed tangibly in three-dimensional space, (b) as part of the tactile display unit 6, a deformable, shape-changing tactile display 8, which displays surface-based, tangible characteristics such as textures, contours, reliefs, object heat, and moisture, and as an additional subcomponent of 6, a deformation mechanism 7, which adjusts deformable tactile display 8 to the shape of object surface segment 2 of 3D virtual object 1 to be displayed. In the exemplary embodiment illustrated in FIGS. 1A-1C, positioning device 5 is embodied as a robotic arm. Robotic arms have a large radius of action and are highly flexible in their positioning, for example, they can represent even very large virtual objects haptically. The robotic arm shown is rotatable at its base. With the first two swivel joints, every point in the radius of action can be reached. The third swivel joint of the robotic arm enables tactile display unit 6, which is located thereon, to be aligned in any desired spatial position. In the dimensions of these, the required maximum permissible positioning time, the required positioning accuracy and the mass of tactile display unit 6 located on the robotic arm must be taken into account. The less compact design of the robotic arm allows the installation of protective mechanisms to prevent bruises or the like. Protective mechanisms may include, for example, flexible sleeves as covers for the area of action, or corresponding pressure sensor, torque sensor, or other suitable sensor units.

Figures 1A, 1B, 1C:
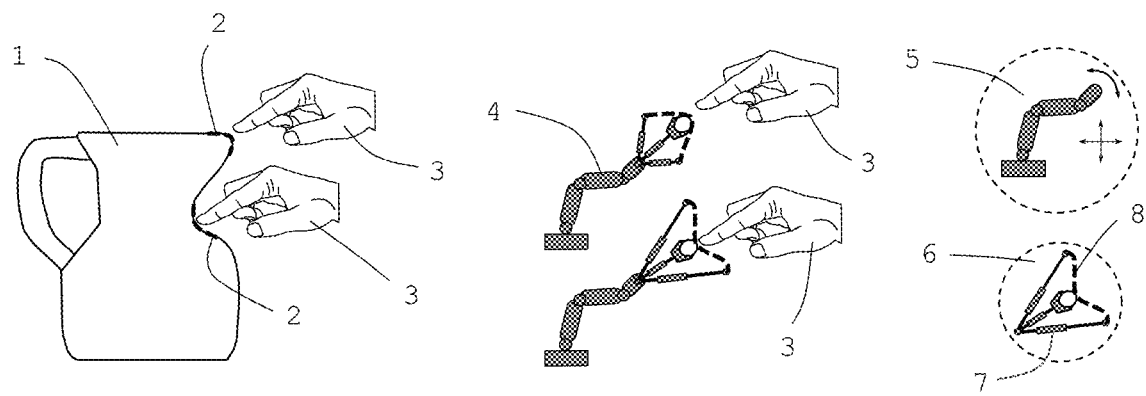
FIGS. 1A-1C are schematic representations of a haptic display subsystem and of the basic principle for concretizing virtual three-dimensional objects, with FIG. 1A showing the virtual three-dimensional object to be grasped by the user, along with the contact area around the collision point, FIG. 1B showing the basic structure of the haptic display system, and FIG. 1C showing the subcomponents thereof.

Tactile display unit 6 consists of tactile display 8 and a deformation mechanism 7. Tactile display 8 is designed as deformable or mechanically flexible. In one embodiment, the base material may be an elastomer. Deformation mechanism 7 in FIGS. 1A-1C consists of rod-shaped linear drives, which are mounted at suitable points on the tactile display 8 such that they can deform it as desired in a predetermined frame, and can thus achieve any shape of portion 2 of the represented object.

Figure 2:
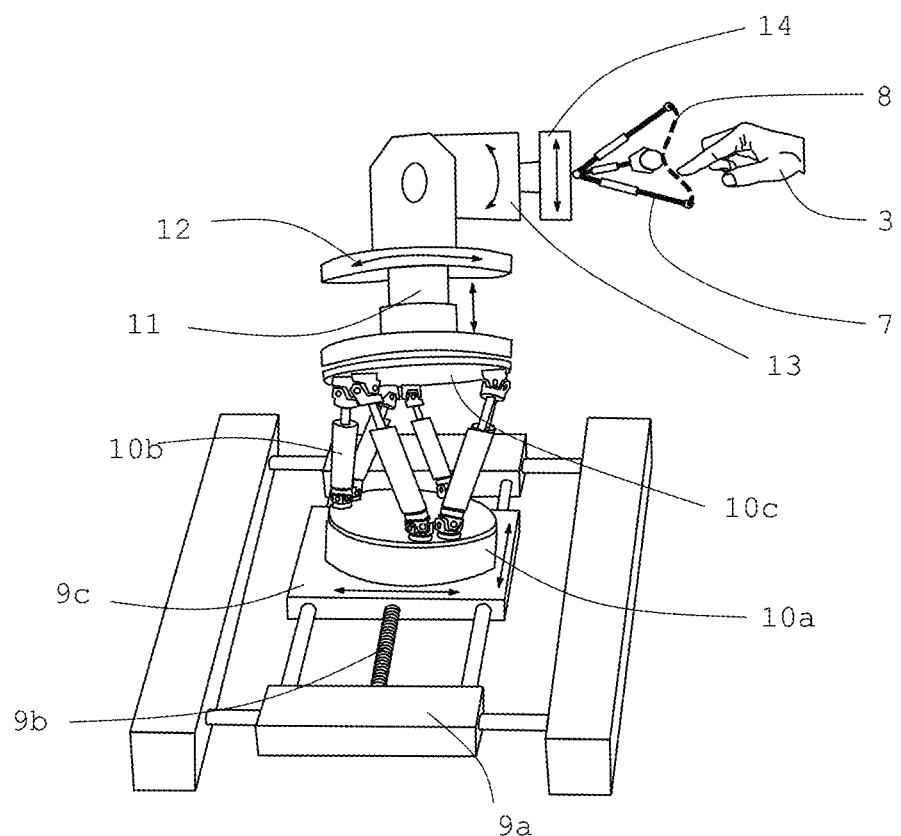
FIG. 2 is a schematic representation of a further embodiment of the morphling.

FIG. 2 shows a further embodiment of morphling 4 in a further exemplary embodiment. Here, the morphling consists of an X-Y positioning table 9, a hexapod 10, a translational drive element 11, a rotational drive element 12, a swivel arm 13, a further translational drive element 14, deformation mechanism 7, and tactile display 8. Elements 9 to 14 are parts of positioning device 5. The vertical structure is positioned in the X-Y plane by the appropriate positioning of positioning platform 9c by means of drives 9a and 9b, which can be designed, for example, as spindle drives. Located on positioning platform 9a is the remainder of the assembly, beginning with hexapod 10, which is mounted on positioning platform 9c with lower platform 10a. A hexapod is a special parallel kinematic device equipped with six linear drive elements 10b. This allows a fast and well-defined positioning of upper platform 10c in all six degrees of freedom (three translational and three rotational). Next, a translational drive element 11 is placed on the upper platform 10c, which can achieve greater linear positioning movements of the assembly located above it. Rotational drive element 12 mounted thereon can rotate the remaining head part 360° in all directions. Pivot arm 13, which follows the above drive element, can position tactile display unit 6, comprising 7 and 8, in its position of inclination, and a fine positioning of the display unit 6 is then possible using translational drive element 14.

Figure 3:
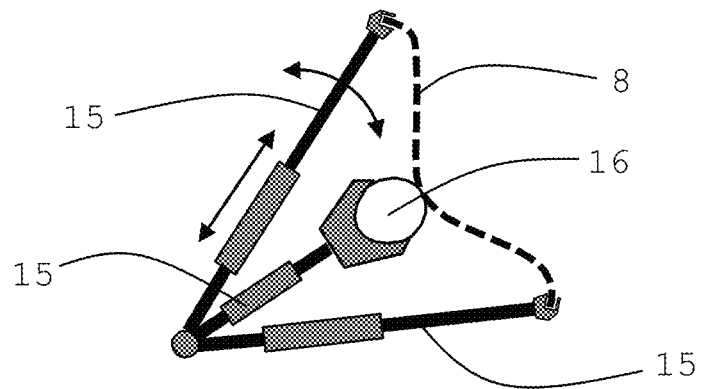
FIG. 3 is a schematic representation of an embodiment of the deformation mechanism, with pivotable and rotatable linear drives.

FIG. 3 shows a further exemplary embodiment of a deformation mechanism 7 for deformable, tactile display 8. The deformation mechanism is formed by a number of rod-shaped linear drive elements 15 that are variable in length. In addition, elements 15 are arranged so as to be pivotable and/or rotatable in such a way that they can shape the flexible, tactile display unit in virtually any desired way, for example, stretching, folding, etc. At least some of the rod-shaped drive elements can be equipped with head elements 16, which can supply certain haptic surface characteristics, e.g. resiliency or softness, certain geometries, contours, and edges, which then do not need to be represented separately by deformable tactile display 8. The position of the individual rod-shaped linear drive elements 15 relative to one another can be defined by drives not described in detail here, which provide the necessary torques and/or kinematic movements. Alternatively, this may also be achieved by means of rod-shaped linear drive elements arranged transversely between elements 15, which are likewise not shown.

Figure 4:
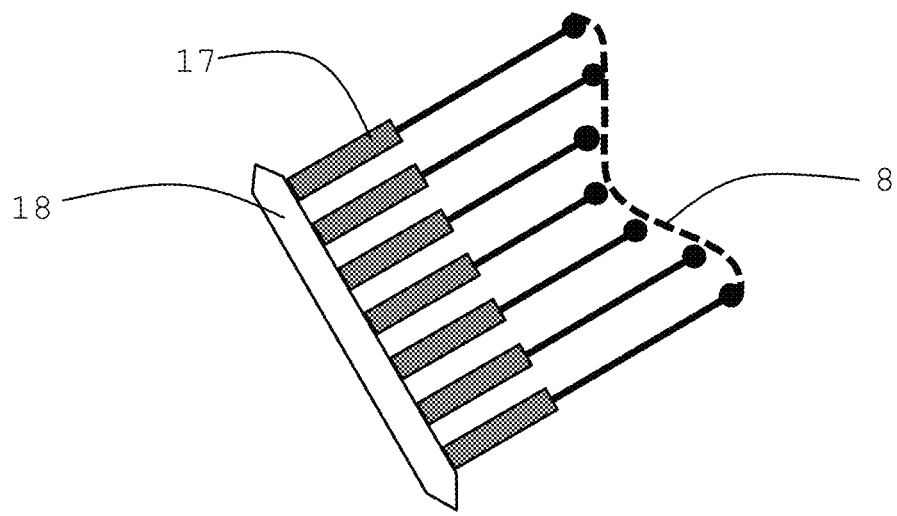
FIG. 4 is a schematic representation of a further embodiment of a deformation mechanism, with rod-shaped drive elements arranged in the form of a matrix to produce a rod cushion.

FIG. 4 illustrates an exemplary embodiment of a deformation mechanism in the form of rod-shaped linear drive elements 17 arranged in the form of an array, in the manner of rod or pin cushions. Rod-shaped linear drive elements 17 are embodied such that they can act only in the Z direction, and can thus change their height relative to mounting plate 18. In the simplest case, mounting plate 18 is a perforated plate, in which the holes are guides for rod-shaped elements 17. Rod-shaped drive elements 17 can each have their own drive mechanism, e.g. in the form of shape memory wires, piezoelectric actuators, or a fluidic (fluidic comprises hydraulic and pneumatic) mechanism. Alternatively, if rod-shaped elements 17 do not have their own actuating mechanism, they can be moved to their respective desired Z positions by means of a writing device (not shown). Such an actuation mechanism may be a row writer, for example. This device can write one row (e.g. X direction) of the rod cushion at the same time, and thus suitably has the same number of linear actuator elements acting in the Z direction as the number of pins to be positioned in one row, and has the same grid dimensions. By positioning them in the Y-direction, rods 17 can be moved into their respective Z positions, row by row. An alternative to a writing row would be, e.g., a rotational element in the manner of a sprocket, such as are used, for example, in mechanical music boxes.

Figure 4A:
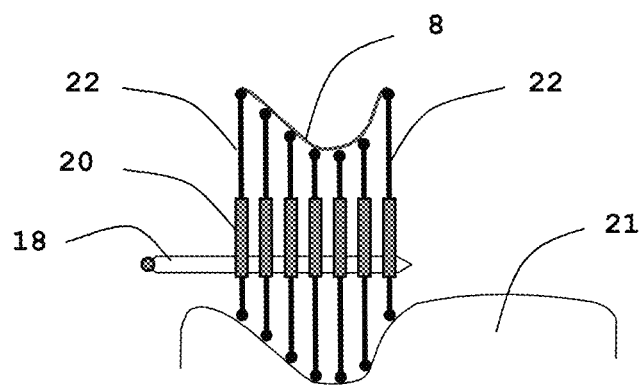
FIGS. 4A-4C are schematic representations of further embodiments of a deformation mechanism, with rod-shaped drive elements arranged in the form of a matrix to produce a rod cushion.

In a further exemplary embodiment of the deformation mechanism, a securing mechanism (or locking mechanism) 20 encloses rod elements 22, the position of which is determined by a die (positive shape) 21. For the shaping process, all the individual locking mechanisms 20 of rod elements 22 are released, so that the rod elements move in the direction of die 21, strike the die and assume their final position, after which they are locked in place again by securing mechanism 20. This movement can be caused by the gravitational force acting on rod elements 22, if they are appropriately positioned. Alternatively, once the locking mechanism has been loosened, in a resetting process, rod elements 22 can be pushed toward die 21 by means of a relative movement toward a flat plate (not shown) that is located above rod elements 22, in which case die 21 is spaced far enough away that it is not yet effective. After this process of resetting the rod elements, rod elements 22 are aligned with die 21 by a relative movement toward it, when all of rod elements 22 are touching die 21 as shown in FIG. 4A. All of rod elements 22 are then locked in place by means of securing mechanism 20. Alternatively, shaping may be implemented using a negatively shaped die located in front of tactile, deformable display 4.

Figures 4B, 4C:
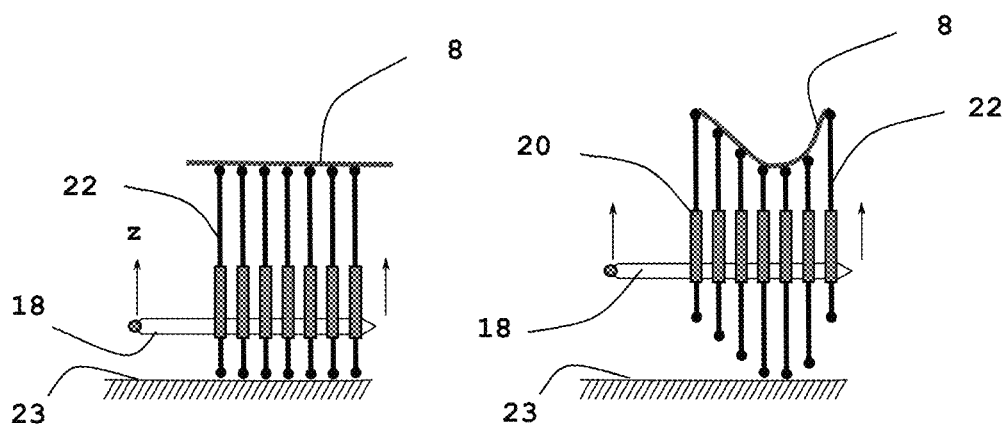

In a further exemplary embodiment of the deformation mechanism, rod elements 22 can be locked in place individually or in groups. For shaping, first all of rod elements 22 are released and are moved in the direction of a flat counter plate 23 until the reset position is reached. FIG. 4B shows the reset position. Mounting plate 18 is then moved in the z direction, and each of rod elements 22 is locked in place by securing mechanism 20 upon reaching its intended position (FIG. 4C).

Figures 5A, 5B, 5C, 5D, 5E, 5F, 5G:
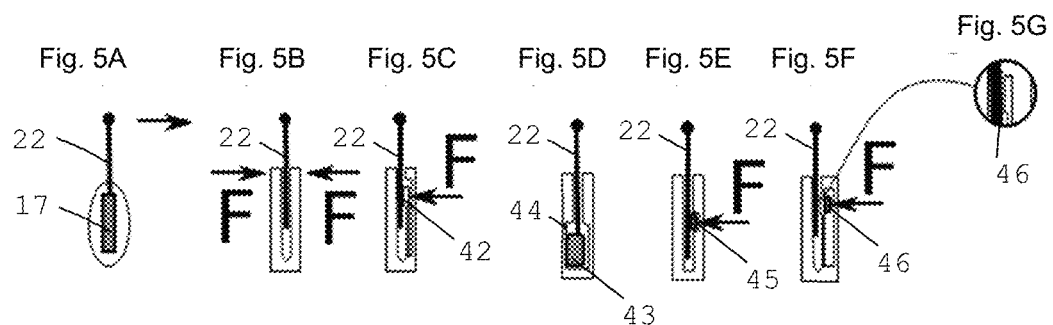
FIGS. 5A-5G are schematic representations of various locked positions of the rod-shaped elements, where: (i)

Rod-shaped elements 17 can be locked in place in mounting plate 18 following the writing process (FIG. 4), e.g. by fluidic or other mechanisms at the guide holes of mounting plate 18, which mechanisms either alter the friction characteristics of the guide or lock the pins in place mechanically, e.g. by clamping, as shown in FIGS. 5A-5G for various embodiments. In FIG. 5A, a linear actuator 17 or a hydraulic or pneumatic device contains the securing mechanism, in FIG. 5B, locking is effected by clamping, in which a force F acts on the rod element at specific points or as a surface load F/A over an area A, in FIG. 5C locking is effected by a unimorph or bimorph 42, in FIG. 5D by a volume actuator (locking element) 43 in a melt or hydraulic or pneumatic pouch 44, in FIG. 5E by a piezoelectric or phase converter 45, which in FIG. 5F are supported by special structures, e.g. as shown in FIG. 5G in the form of a shape support or a surface with increased friction 46. In this process, the contact surface may be enlarged by a cross-section of rod element 22 (not shown), embodied, for example, as trough-shaped or trapezoidal. In the case of electrostatic locking, rod element 22 forms one electrode and the locking element forms the second electrode, and a voltage is applied between the two electrodes. If a phase converter is used, as in FIG. 5E, a meltable substance can advantageously be used. Once it sets, the structure is vibration-resistant. In an embodiment involving an electrorheological or magnetorheological fluid, friction can be controlled electrically or magnetically.

The grid dimension comprising the diameter of the rod-shaped linear drive elements 17 and the spacing between them is important for haptically conveyable information. The smaller the grid dimension, the more location-resolved tactile information can be represented. Rod cushions are ideal for representing reliefs, profiles, contours, and edges. If elements 17 are oscillation conductors, they can also be used to achieve a vibrotactile display functionality at the same time in a functional integration, which in extreme cases would make it possible to dispense with the separate execution of deformable tactile display 8. Alternatively, the individual rod-shaped linear drive elements can carry effectors in their head region that implement the vibrotactile functionality. Of course, a deformable tactile display 8 can also be located above elements 17, to provide the necessary, e.g. vibrotactile functionalities.

Figure 6:
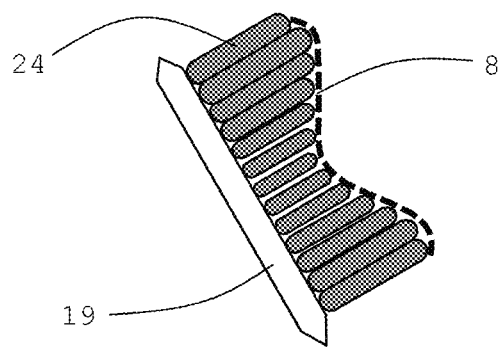
FIG. 6 is a schematic representation of a deformation mechanism based on fluidic expansion elements.

FIG. 6 shows an exemplary embodiment of a deformation mechanism based on fluidic expansion elements 24. The operating principle here is similar to that of the rod cushion. Fluidic (hydraulic or pneumatic) expansion elements 24 each act in the Z direction and can thus also present highly varied and effective contours, profiles, reliefs, and edges. In a simple embodiment, the fluidic expansion elements are cylinder-piston assemblies. Flexible arrangements for expansion elements 24 offer a suitable alternative. A corresponding exemplary embodiment is a McKibben element, in which the sheath that can be filled with fluid is made of a flexible woven fabric. In its initial state, the McKibben element is stretched out to the length of the woven fabric or fibers. When an overpressure is applied, the element expands in the radial direction and, since the sheath fabric fibers cannot be stretched, a contraction of the element in the Z direction in effect occurs. A further embodiment is a bellows element. This is configured similarly to a concertina and may be cylindrical or some other shape. When the pressure inside the bellows element increases, it expands only axially along the Z axis, while no appreciable radial deformation occurs. A further embodiment of fluidic expansion element 24 may be element with an elastic sheath. When the pressure increases, this element expands radially and axially like a balloon. The axial expansion can be positively suppressed. Also suitable in this case are structures in which a pressure chamber is covered by an elastic membrane, which is deflected in the Z direction by a pressure increase.

Figure 6A:
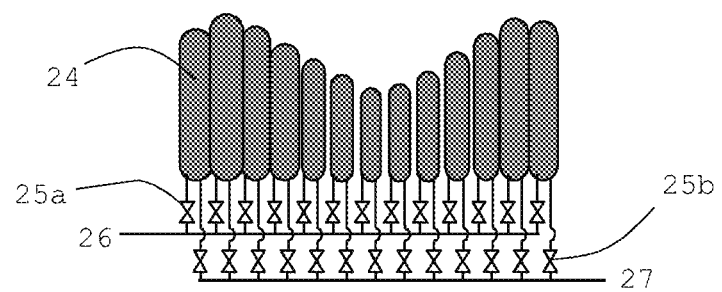
FIG. 6A is a schematic representation of a fluidic valve circuit of the array of fluidic expansion elements.

FIG. 6A shows an exemplary embodiment of a fluidic valve circuit for an array of fluidic expansion elements 24. Each fluidic expansion element 24 has an inlet-side valve 25a connected to fluid inlet 26, which is pressurized, and an outlet-side valve 25b connected to fluid outlet 27, which acts as a fluidic mass, i.e. it has no overpressure. To actuate fluidic expansion element 24, inlet valve 25a must be opened while outlet-side valve 25b is closed. When the expansion element has reached its desired Z position according to its internal pressure, inlet-side valve 25a is closed and element 24 remains in its expanded state. To reduce the Z expansion, outlet-side valve 25b is opened until the reduced internal pressure required for the new Z expansion is reached. For large arrays having a large number of expansion elements, the number of valves can become very high. By using a fluidic row-column multiplexer [T. Thorsen, S. J. Maerkl, S. R. Quake, Microfluidic large-scale integration, *Science* 298 (2002), 580-584], the number of switching valves required for such control can be greatly reduced. In a further embodiment, not shown in detail, fluidic expansion elements 24 can be actuated using only a single valve 25 and only a single control line. This requires an alternating control pressure. As the control pressure increases, the valve is closed precisely when expansion element 24 has reached its intended Z-expansion position. Conversely, for element contraction, the valve must be opened, and must not be closed again until the control line pressure has dropped to the required level.

Figure 7:
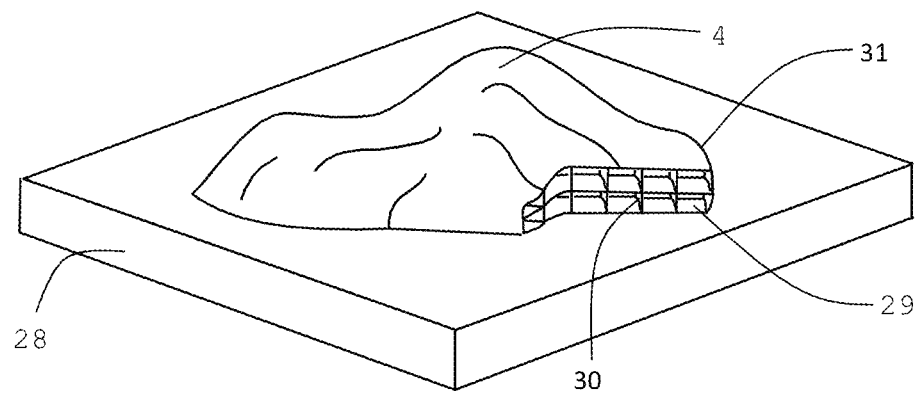
FIG. 7 is a schematic representation of a further embodiment of the tactile display system with a fluidically controllable multi-chamber system.

FIG. 7 shows an exemplary embodiment of tactile display system 4 consisting of a device which has a fluidically controllable multi-chamber system. Morphling 4 is located on a carrier plate 28. Said morphling consists of a plurality of fluidic chambers 29 which can be expanded, individually or in compartments, pneumatically or fluidically by applying an overpressure, and can be contracted by reducing the overpressure. The fluidic chambers 29 have flexible chamber walls 30, and can be embodied as square, rectangular, hexagonal, or cylindrical, and can be stacked both horizontally and vertically. Chamber walls 30 can be either mechanically deformable, in particular bendable, but not expandable. This enables mechanically highly stable objects to be represented by corresponding applications of pressure, but is somewhat limited in terms of the size and shape of the virtual object. If the chamber walls are not only mechanically flexible but also extensible, the degrees of freedom in terms of the size and shape of the virtual object to be presented are comparatively greater. In certain circumstances, this may be at the expense of the stability of the haptic display system (morphling) 4. The direction of expansion of fluidic chambers 29 can be on all sides. In other embodiments, the direction of expansion of fluidic chambers 29 is directed. Some chambers 29 can preferably expand in the X-Y plane, for example, others mainly in the Z direction. A specific design of the configuration of the multi-chamber system structure of fluidic chambers 29, each with specifically defined expansion directions, is suitable in particular for morphlings 4 that are integrated into display systems designed for specific application scenarios. Such application scenarios, for example, in imaging diagnostics and minimally invasive surgery, require only the representation of specific object groups, such as organs or other anatomical body parts. For brain surgery, it is advisable to create morphlings that are capable of representing the anatomy of the brain or parts of the brain in detail by their specific configuration. For examinations of the abdominal cavity, suitable preformed or functionalized morphlings 4 should be specific to the anatomy of certain organs, e.g. the liver, the intestinal tract, or the stomach. In some embodiments, it is possible for a 4D display system to comprise several different morphlings representing the organs in the abdominal region, e.g. an individual morphling for each organ such as the liver, intestinal tract, stomach, kidney, uterus, and lymph nodes.

In other embodiments, through a clever combination and actuation of the plurality of fluidic chambers 29, virtual objects or portions of the surfaces thereof in a wide range of shapes and sizes can be represented in tactile form by morphling 4. This embodiment of the multi-chamber system has high functional integration. It combines the functions of the deformation mechanism, the tactile, deformable display, and, at least for virtual objects of a suitable shape, the positioning device. However, the structure may also be attached to a positioning device 5, in which case it would comprise only the functions of the deformation mechanism and the deformable tactile display.

Figure 8A:
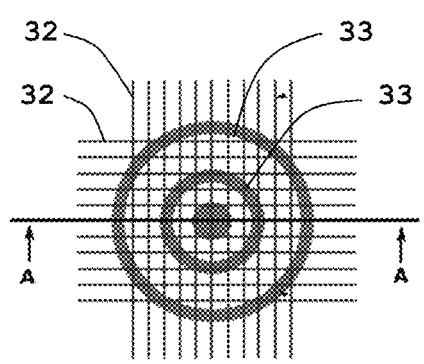
FIGS. 8A-8J are schematic representations of various configurations of the tactile display system.
Figure 8B:
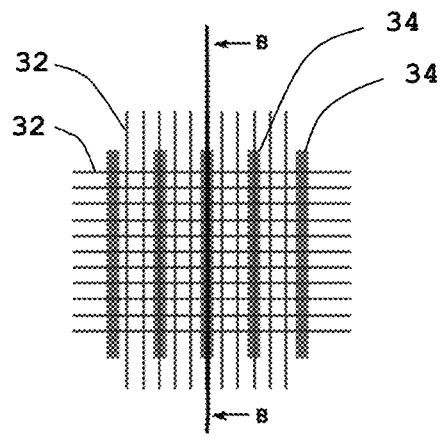
Figure 8C:
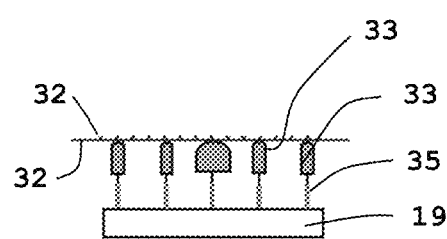
Figure 8E:
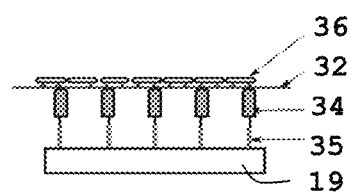
Figure 8D:
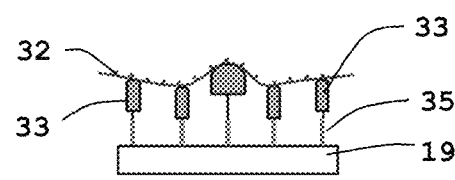
Figure 8F:
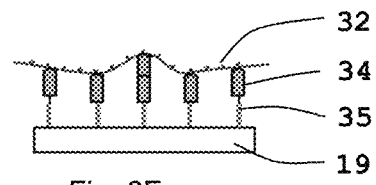

FIGS. 8A-8J show an embodiment of the haptic display system (morphling) 4 consisting of a flexible mechanical structure with flexible bending rods or bending bars 32 which, as shown in FIG. 8A, are held by means of fixed supporting rings 33 of different diameters, and as shown in FIG. 8B are held by rigid supporting rods 34. The flexible rod network is intended to provide sufficient strength and dimensional stability. Supporting rings 33 and supporting rods 34 are connected via linear actuators 35 to a carrier plate 28, so that the distance between the point of attachment of the actuator to supporting ring 33 or supporting rod 34 can be varied individually. Three actuators are recommended per supporting ring, arranged spaced, for example, by a distance of one-third the circumference of the ring, and two actuators are recommended per supporting rod 34. The closer the two actuators of a supporting rod are to each other, the greater the resulting lever effect. FIGS. 8C-8D show two different sectional views AA, and FIGS. 8E-8F show two different sectional views BB, each with various deflections of the actuators. An arrangement of supporting rods in multiple directions (e.g. x and y directions) is possible and can be used advantageously. In FIG. 8B the supporting rods are shown in only one direction.

Figure 8G:
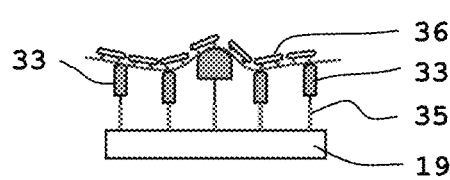
Figure 8H:
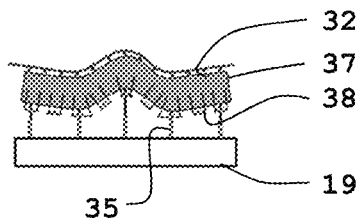

In sectional view BB and in FIG. 8G the flexible rod construction supports rigid tactile display elements 36.

Figure 8I:
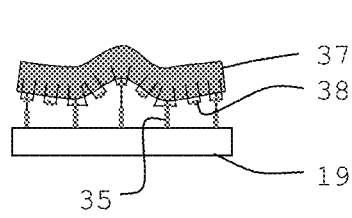

In one exemplary embodiment, an elastomechanical layer 37 is used in place of supporting rings 33 or supporting rods 34, which is flexible but assumes a uniform shape, and at the same time possesses the stability for suitable vibrotactile surface output. It may contain an array of local actuators 38 that provide additional local deformation. Local actuators 38 can support or replace the vertical actuating deformation, as shown in FIG. 8I.

Figure 8J:
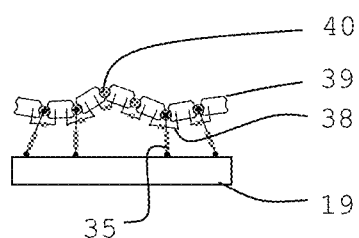

In an exemplary embodiment according to FIG. 8J, the 3D support structure is formed by surface elements (links) 39, connected to one another via joints 40. To represent spherical surfaces, an embodiment of the links with spring elements is advantageous. The links can be connected, for example, by means of cable pulls drawn through holes in the elements.

Figure 9A:
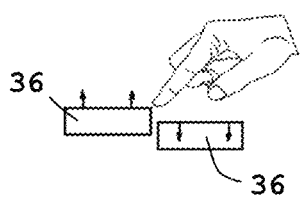
FIGS. 9A-9I are schematic representations of various exemplary embodiments for the representation of edges, where
Figure 9B:
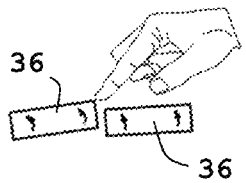
Figure 9C:
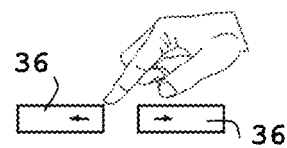
Figure 9D:
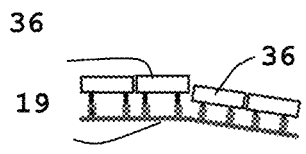
Figure 9E:
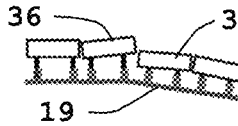
Figure 9F:
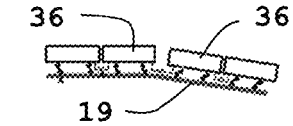
Figure 9G:
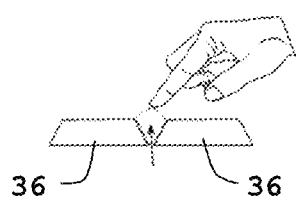
Figure 9H:
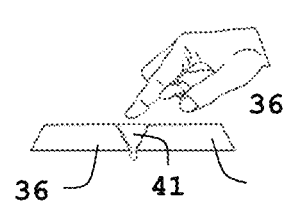
Figure 9I:
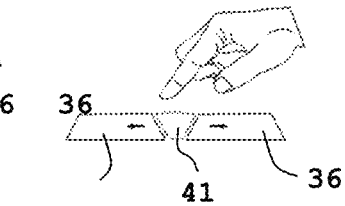

FIGS. 9A-9I show various exemplary embodiments for representing tangible edges: FIGS. 9A-9F show a structure for this purpose, which is located on the tiles and which changes, and FIGS. 9G-9I show tile intermediate spaces configured for this purpose. Three design variants are shown in the figures. FIG. 9A and FIG. 9D show an edge formation or presentation by displacement, FIG. 9B and FIG. 9E show an edge formation by rotation or tilting, and FIG. 9C and FIG. 9F show an edge formation by an increase in spacing. FIG. 9G illustrates a tangible edge display generated using an intermediate space fluid, e.g. a magnetorheological fluid. The hardness, the viscous characteristics, and the coefficient of friction in the intermediate spaces are varied, and the haptic elements 36 (tiles) are suitable for generating electric or magnetic fields. In this way, the volume of the intermediate space is changed, thereby raising or lowering it. If gases are used, the temperature is changed accordingly for this purpose. FIG. 9H shows an edge curvature change produced by adjusting the volume of the solid model, while FIG. 9I shows a change in edge curvature produced by adjusting the intermediate space. In this variant, the spacing or the position of the tiles is varied, and as a result, the enclosed fluid (air, liquid) is partially or fully raised or lowered.

The incorporation of contact-based, physical interaction with concretized virtual three-dimensional objects opens up entirely new possibilities for virtual reality technologies. For one thing, users can be immersed in virtual worlds that are practically indistinguishable from the real world. For another, our system enables completely new approaches for the simulation and presentation of objects. Described below are just a few examples of the many conceivable applications.

Imaging diagnostics, such as impedance measurement, sonography, magnetic resonance imaging, scintigraphy, positron emission tomography, single-photon emission computer tomography, thermography, computer tomography, digital volume tomography, and electroencephalography, as well as optical methods, typically determine three-dimensional data for certain characteristics of a body being examined, with high spatial resolution. These may include, for example, its density, its water content, the presence of certain substances such as markers, and its electroactivity. The data obtained are currently predominantly output in visual false color 2D or 3D representations. Analysis of this data therefore typically requires expert knowledge, and cannot be performed intuitively and in real-time. By concretizing the organs or at least segments thereof, the 4D display system according to the invention with the morphlings according to the invention enables these to be intuitively recognized by sense of touch, as is learned by physicians in their study of conventional surgery, but without having to actually cut into the body. This is because, both in conventional surgery performed on open patients and with the 4D display, the tissue is felt for its mechanical characteristics, so that, e.g. indurations can be detected easily, reliably, in a localized manner, and intuitively, and in real time.

In minimally invasive surgery combined with perioperative diagnostic imaging, the advantages of conventional surgery in the open patient are combined with the advantages of minimally invasive surgery. The surgeon can see the data obtained through diagnostic imaging and output in real-time as a concretized organ that he can feel with his hands, allowing him to explore the operating field intuitively and directly and perform or initiate the appropriate surgical or other treatment. If the control elements of the minimally invasive tools are coordinated with the concretized virtual objects, it is even possible to perform the operation directly on the virtual, concretized object. Surgeons can advantageously utilize zoom functions, reach into organs, and other things that are made possible by electronic data processing and the special presentation of the data, which can greatly facilitate diagnostics and treatment. In addition, organs are now accessible through touch in areas where this must be strictly avoided in reality, for example in the brain.

The 4D display technology according to the invention also allows virtual object libraries to be created, making animal and organ preparations obsolete, for example, surgical findings in the digitalized state can be presented to students and other interested parties immediately, without the need for real specimens, very rare or costly articles such as works of art, e.g. in museums, become accessible to larger portions of the general public, and the haptics of objects can be simulated and thus explored during the design process, without having to be objectively implemented. This ability to simulate actually existent or even imaginable objects in the form of concretized virtual three-dimensional objects offers entirely new possibilities for the design process, but also for the presentation of results or selectable equipment features both within companies and with customers, since the communication of an overall impression is now possible.

The 4D display technology according to the invention also has the potential to dramatically alter online purchasing. Customers are now able to conveniently examine the haptics of clothing, furniture, or even automobile upholstery from the comfort of their home and thus make more informed purchase decisions.

Movie theaters can also benefit significantly from the 4D display system according to the invention. While in normal 3D films viewers still play a passive role, in current virtual reality they are right in the middle and can see everywhere in all directions. In other words, they can go places they ordinarily could not reach. The 4D display technology according to the invention allows viewers not only to see the virtual objects and/or the virtual environment but also to feel them. In "Jurassic Park", for example, the dinosaurs can not only be viewed, but also touched.

Immersing the user in a virtual world, including a visual, auditory, and full tactile data channel, enables the user to achieve an overall perception, in which he can no longer distinguish the virtual world from the real world. This can be used to develop computer games with entirely new possibilities based on entirely new methods. Relationships with objects or even partners in social networks can also be revolutionized. Finally, partners can interact physically with one another over long distances, even with purely virtual partners.

LIST OF REFERENCE SIGNS 1 virtual three-dimensional object
2 portion of the object at the collision point
3 user hand
4 haptic display system, morphling
5 positioning device
6 tactile display unit
7 deformation mechanism
8 deformable tactile display
9 X-Y positioning table
9a drive for X axis
9b drive of the drive for Y axis
9c positioning platform
10 hexapod
10a lower platform
10b drive element
10c upper, positioned platform
11 translational drive element
12 rotational drive element
13 swivel arm
14 translational drive element
15 rod-shaped linear drive element
16 head element
17 rod-shaped linear drive element
18 mounting plate
19 carrier plate
20 securing mechanism
21 die (positive shape)
22 rod element
23 resetting plate
24 fluidic expansion element
25 valve
25a inlet-side valve
25b outlet-side valve
26 fluid inlet
27 fluid outlet
28 carrier plate
29 fluid chambers
30 chamber wall
31 surface, tactile display
32 bending rod
33 supporting ring
34 supporting rod
35 rod-shaped linear drive element
36 tactile display element
37 elastomechanical layer
38 actuator for local support structure deformation
39 surface element
40 joint
41 solid model
42 unimorph or bimorph
43 locking element
44 melt or hydraulic or pneumatic pouch
45 piezoelectric or phase converter
46 surface with teeth or with increased friction

The invention claimed is:
1. A haptic display system comprising:
a deformable, shape-changing, tactile display suitable for contact by a user, which imparts surface-based, tangible surface shape and surface characteristics of a virtual three-dimensional (3D) object displayed in a visual subsystem, said visual subsystem being effective to produce a virtual representation of at least a part of the user making contact with the virtual 3D object;
a positioning device, which moves the tactile display to a position of a surface segment or surface section of the virtual 3D object in three-dimensional space to be displayed in tangible form; and a deformation mechanism, which adjusts the deformable tactile display to the shape of the surface segment or surface section of the virtual 3D object to be displayed in tangible form, wherein said haptic display system is configured to function with the visual subsystem, thereby enabling the tactile display to be positioned and shaped to correspond to the surface segment or surface section of the virtual 3D object at a collision point, wherein said collision point is a point of collision of the virtual 3D object and the virtual representation of the user making contact with the virtual 3D object.

2. The haptic display system according to claim 1, characterized in that the positioning device for positioning in the three-dimensional space of the tactile display is a robotic arm, a delta robot, a hexapod, a multi-axis system, or a chamber system.

3. The haptic display system according to claim 1, characterized in that the tactile display is segmented or subdivided into a plurality of elements, and the surface behavior of said plurality of elements can be controlled independently of one another.

4. The haptic display system according to claim 1, characterized in that the haptic display system has at least one device for generating oscillations that produce tangible vibrations in the tactile display or in selected subcomponents of the tactile display.

5. The haptic display system according to claim 1, characterized in that the haptic display system comprises static displays.

6. The haptic display system according to claim 1, characterized in that the tactile display includes subcomponents that are designed as controllable by capacitive, piezoelectric, electrodynamic, electromagnetic, electromechanical, or magnetostrictive devices, or as dielectric elastomer elements, or are designed to act pneumatically, hydraulically, or fluidically on the hand or other body parts of the user at the collision point.

7. The haptic display system according to claim 6, characterized in that the tactile display and/or the subcomponents are designed as temperature-controllable.

8. The haptic display system according to claim 1, characterized in that the deformation mechanism includes various subcomponents, which are designed to be positioned variably relative to one another.

9. The haptic display system according to claim 1, characterized in that subcomponents of the deformation mechanism are designed such that their dimensions can be varied by increasing or decreasing their volume, or are designed as actuating elements.

10. The haptic display system according to claim 1, characterized in that the deformation mechanism of the tactile display includes a carrier substrate which is designed to hold one or more actuating elements.

11. The haptic display system according to claim 1, characterized in that the deformation mechanism of the tactile display is designed as an actuating component composed of a plurality of actuating subcomponents, or is designed as a multi-chamber system.

12. The haptic display system according to claim 11, characterized in that actuating subcomponents are designed as rod-shaped.

13. The haptic display system according to claim 12, characterized in that the multi-chamber system is designed such that the chambers can be individually filled pneumatically, fluidically, hydraulically, and/or with granular materials.

14. A system for interacting with virtual objects comprising:
a first device for capturing three-dimensional data of a user,
a device for capturing three-dimensional data of an object,
a data processing device for processing in real time the captured three-dimensional data of the user, and for generating a visual representation of the three-dimensional data of the user,
a data processing device for processing in real time the captured three-dimensional data of a first object, and for generating a visual three-dimensional representation of the first object in real time,
a visual subsystem with a display device for the visual and synchronized representation of the three-dimensional data of at least the first object and the user, and
a haptic display system according to claim 1.

15. A method of using a haptic display system in a system for interacting with virtual objects according to claim 14, wherein said haptic display system comprises:
a deformable, shape-changing, tactile display, which imparts surface-based, tangible characteristics,
a positioning device, which moves the tactile display to the position of the surface segment or surface section of a virtual 3D object in three-dimensional space to be displayed in tangible form, and
a deformation mechanism, which adjusts the deformable tactile display to the shape of the object surface segment to be displayed.

16. A system for interacting with virtual objects comprising:
a visual subsystem with a display device for the visual and synchronized representation of three-dimensional data of a virtual object and a user, and
a haptic display system according to claim 1.

17. A method for interacting with virtual objects, said method comprising: using a system, the system comprising:
(a) providing a system according to claim 16;
(b) providing a synchronized real-time representation of three-dimensional data of a virtual object and of a part of a user in the visual subsystem, wherein visualized three-dimensional data of the virtual object is displayed with visualized three-dimensional data of the user in the display device of the visual subsystem; and
(c) using the system to interact the body part of the user with the virtual object, wherein the representation of the interaction of the at least one body part of the visualized user with the visualized object in the visual subsystem and the simultaneous interaction of the user with the haptic element take place in a tactile subsystem, wherein upon collision of the body part of the visualized user with the visualized object a collision point is determined, and the three-dimensional data of the object at the collision point of the body part of the visualized user with the visualized object are displayed with the haptic display system.

18. A method for interacting with virtual objects using a system, the system comprising:
(a) a first device for capturing three-dimensional data of a user,
(b) a device for capturing three-dimensional data of an object, (c) a data processing device for processing in real time the captured three-dimensional data of the user, and for generating a visual representation of the three-dimensional data of the user, (d) a data processing device for processing in real time the captured three-dimensional data of a first object, and for generating a visual three-dimensional representation of the first object in real time, (e) a visual subsystem with a display device for the visual and synchronized representation of the three-dimensional data of at least the first object and the user, and (f) a haptic display system;

and the method comprising the following steps:

capturing three-dimensional data of a user in real time, capturing the movement and the compressive forces and/or the mechanical stresses induced by the user at the collision point, processing the captured data about the movement and the compressive forces and/or the induced mechanical stresses, generating a visual real-time representation of a body part of the user based on the three-dimensional data of the user, generating a visual three-dimensional real-time representation of an object based on the three-dimensional data of the object, and providing a synchronized real-time representation of the three-dimensional data of the object and of the body part of the user in the visual subsystem according to the invention, the visualized three-dimensional data of the object being displayed with the visualized three-dimensional data of the user in the display device of the visual subsystem, wherein the representation of the interaction of the part of the visualized user with the visualized object in the visual subsystem and the simultaneous interaction of the user with the haptic element according to the invention take place in a tactile subsystem, wherein upon collision of the part of the visualized user with the visualized object a collision point is determined, and the three-dimensional data of the object at the collision point of the part of the visualized user with the visualized object are displayed the haptic display system, wherein said haptic display system comprises:

a deformable, shape-changing, tactile display suitable for contact by the user, which imparts surface-based, tangible surface shape and surface characteristics of the virtual 3D object, a positioning device, which moves the tactile display to a position of a surface segment or surface section of the virtual 3D object in three-dimensional space to be displayed in tangible form; and a deformation mechanism, which adjusts the deformable tactile display to the shape of the surface segment or surface section of the virtual 3D object to be displayed in tangible form, wherein said haptic display system is configured to function with the visual subsystem, thereby enabling the tactile display to be positioned and shaped to correspond to the surface segment or surface section of the virtual 3D object at a collision point, wherein said collision point is a point of collision of the virtual 3D object and the virtual representation of the user making contact with the virtual 3D object.

19. The method according to claim 18, characterized in that the three-dimensional data of at least one object are captured in real-time, in which the object to be represented is captured by a device for capturing three-dimensional data.

20. The method according to claim 18, further comprising:

capturing eye movements of the user, processing the captured eye-movement data and determining the active field of view of the user, implementing the captured eye-movement data and the active field of view in the visual subsystem, wherein the captured eye-movement data of the user control an in situ adjustment of the visual representation of the object and the visual representation of the hand movement in the area of the active field of view.

21. The method according to claim 18, further comprising:

capturing the movement and the compressive forces and/or the mechanical stresses induced by the user at the collision point, processing the captured data about the movement and the compressive forces and/or the induced mechanical stresses, implementing the captured data about the movement and the compressive forces and/or the induced mechanical stresses in the system for virtual representation of the object, wherein the captured data about the movement and the compressive forces of the user control a local adjustment of the virtual representation of the object along with the visual representation of the hand movement in the area of the active field of view.

22. A method of using a haptic display system for interacting with virtual data, the method comprising (a) capturing three-dimensional data of a user in real time, (b) capturing the movement and the compressive forces and/or the mechanical stresses induced by the user at a collision point, (c) processing the captured data about the movement and the compressive forces and/or the mechanical stresses, (d) generating a visual real-time representation of a body part of the user based on the three-dimensional data of the user, (e) generating a visual three-dimensional real-time representation of an object based on the three-dimensional data of the object, (f) providing a synchronized real-time representation of the three-dimensional data of the object and of the body part of the user in a visual subsystem, the visualized three-dimensional data of the object being displayed with the visualized three-dimensional data of the user in the display device of the visual subsystem, wherein said haptic display system comprises:

a deformable, shape-changing, tactile display suitable for contact by the user, which imparts surface-based, tangible surface shape and surface characteristics of the virtual 3D object;

a positioning device, which moves the tactile display to a position of a surface segment or surface section of the virtual 3D object in three-dimensional space to be displayed in tangible form; and a deformation mechanism, which adjusts the deformable tactile display to the shape of the surface segment or surface section of the virtual 3D object to be displayed in tangible form, wherein said haptic display system is configured to function with the visual subsystem, thereby enabling the tactile display to be positioned and shaped to correspond to the surface segment or surface section of the virtual 3D object at a collision point,
wherein said collision point is a point of collision of the virtual 3D object and the virtual representation of the user making contact with the virtual 3D object.

* * * * *